(12) United States Patent
Ha et al.

(10) Patent No.: US 10,425,666 B2
(45) Date of Patent: Sep. 24, 2019

(54) METHOD AND APPARATUS FOR ADAPTIVE STREAMING USING SEGMENTATION

(75) Inventors: Ho-jin Ha, Suwon-si (KR); O-hoon Kwon, Suwon-si (KR); Sung-bin Im, Yongin-si (KR); Ji-Eun Keum, Suwon-si (KR); Guanhua Zhang, Suwon-si (KR); Hyung-tak Choi, Suwon-si (KR); Sun-bal Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 12/945,545

(22) Filed: Nov. 12, 2010

(65) Prior Publication Data

US 2011/0119395 A1 May 19, 2011

Related U.S. Application Data

(60) Provisional application No. 61/380,461, filed on Sep. 7, 2010, provisional application No. 61/380,477, filed (Continued)

(30) Foreign Application Priority Data

Oct. 22, 2010 (KR) .................. 10-2010-0103721

(51) Int. Cl.
*H04N 21/2343* (2011.01)
*H04L 12/853* (2013.01)
(Continued)

(52) U.S. Cl.
CPC ... *H04N 21/23439* (2013.01); *H04L 47/2416* (2013.01); *H04L 47/38* (2013.01);
(Continued)

(58) Field of Classification Search
CPC ......... H04L 29/06027; H04L 29/06462; H04L 65/80; H04L 65/607; H04L 47/2416;
(Continued)

(56) References Cited

U.S. PATENT DOCUMENTS 5,784,528 A 7/1998 Yamane et al.
6,851,091 B1 2/2005 Honda et al.
(Continued)

FOREIGN PATENT DOCUMENTS

CN 1290895 A 4/2001
CN 1459066 A 11/2003
(Continued)

OTHER PUBLICATIONS

International Search Report (PCT/ISA/210) dated Mar. 28, 2012 in the International Patent Application No. PCT/KR2011/004064.
(Continued)

*Primary Examiner* — Chris Parry
*Assistant Examiner* — Weiwei Y Stiltner
(74) *Attorney, Agent, or Firm* — Sughrue Mion, PLLC

(57) ABSTRACT

A method and apparatus for adaptively transmitting and receiving media data to a streaming environment by segmenting into segments a plurality of media data, which is generated by encoding content to have different qualities.

12 Claims, 23 Drawing Sheets

Related U.S. Application Data on Sep. 7, 2010, provisional application No. 61/318,916, filed on Mar. 30, 2010, provisional application No. 61/314,233, filed on Mar. 16, 2010, provisional application No. 61/267,131, filed on Dec. 7, 2009, provisional application No. 61/262,708, filed on Nov. 19, 2009, provisional application No. 61/260,906, filed on Nov. 13, 2009.

(51) Int. Cl.

| *H04L 12/811* | (2013.01) |
| *H04N 21/235* | (2011.01) |
| *H04N 21/236* | (2011.01) |
| *H04N 21/2362* | (2011.01) |
| *H04N 21/238* | (2011.01) |
| *H04N 21/24* | (2011.01) |
| *H04N 21/2665* | (2011.01) |
| *H04N 21/4722* | (2011.01) |
| *H04N 21/658* | (2011.01) |
| *H04N 21/81* | (2011.01) |
| *H04N 21/845* | (2011.01) |
| *H04L 29/06* | (2006.01) |

(52) U.S. Cl.
CPC ............ *H04L 65/607* (2013.01); *H04L 65/80* (2013.01); *H04N 21/236* (2013.01); *H04N 21/238* (2013.01); *H04N 21/2353* (2013.01); *H04N 21/2362* (2013.01); *H04N 21/234327* (2013.01); *H04N 21/2402* (2013.01); *H04N 21/2665* (2013.01); *H04N 21/4722* (2013.01); *H04N 21/6581* (2013.01); *H04N 21/812* (2013.01); *H04N 21/8455* (2013.01); *H04N 21/8456* (2013.01)

(58) Field of Classification Search
CPC .............. H04L 47/38; H04N 21/23439; H04N 21/2402; H04N 21/2353; H04N 21/236; H04N 21/238; H04N 21/234327; H04N 21/2665; H04N 21/4722; H04N 21/6581; H04N 21/8456
USPC .............................. 709/229–245; 725/83–109
See application file for complete search history.

(56) References Cited

U.S. PATENT DOCUMENTS

| 6,895,410 | B2 | 5/2005 | Ridge |
| 7,103,668 | B1 | 9/2006 | Corley et al. |
| 7,318,099 | B2* | 1/2008 | Stahl et al. ................. 709/229 |
| 7,421,127 | B2 | 9/2008 | Bruls et al. |
| 7,447,791 | B2 | 11/2008 | Leaning et al. |
| 7,760,990 | B2 | 7/2010 | Kato |
| 7,944,908 | B2 | 5/2011 | Lee et al. |
| 8,176,029 | B2 | 5/2012 | Wang |
| 8,205,004 | B1* | 6/2012 | Kaufman ............. H04L 65/607 |
| | | | 375/240 |
| 8,341,662 | B1 | 12/2012 | Bassett et al. |
| 8,619,851 | B2 | 12/2013 | Ito |
| 8,661,105 | B2 | 2/2014 | Tian et al. |
| 2002/0053085 | A1 | 5/2002 | Toguri |
| 2002/0161739 | A1 | 10/2002 | Oh |
| 2002/0172281 | A1* | 11/2002 | Mantchala ....... H04N 21/23412 |
| | | | 375/240.12 |
| 2003/0061369 | A1 | 3/2003 | Aksu et al. |
| 2003/0072376 | A1 | 4/2003 | Krishnamachari et al. |
| 2003/0177503 | A1 | 9/2003 | Sull et al. |
| 2003/0189649 | A1 | 10/2003 | Kuno |
| 2003/0236895 | A1 | 12/2003 | Ohkubo et al. |
| 2004/0064572 | A1 | 4/2004 | Yamaguchi et al. |
| 2004/0064573 | A1 | 4/2004 | Leaning et al. |
| 2004/0119814 | A1 | 6/2004 | Clisham et al. |
| 2004/0187161 | A1* | 9/2004 | Cao ...................... H04N 21/235 |
| | | | 725/110 |
| 2004/0220966 | A1 | 11/2004 | Ridge |
| 2004/0252771 | A1* | 12/2004 | Oishi ...................... 375/240.26 |
| 2005/0018873 | A1 | 1/2005 | Rhoads |
| 2005/0047345 | A1 | 3/2005 | Suh |
| 2005/0068992 | A1* | 3/2005 | Kaku et al. ................. 370/535 |
| 2005/0071491 | A1 | 3/2005 | Seo |
| 2005/0102371 | A1 | 5/2005 | Aksu |
| 2005/0123136 | A1 | 6/2005 | Shin et al. |
| 2005/0135476 | A1 | 6/2005 | Gentric et al. |
| 2005/0160177 | A1 | 7/2005 | Kim |
| 2005/0183120 | A1 | 8/2005 | Jain et al. |
| 2005/0193138 | A1 | 9/2005 | Kim |
| 2005/0193425 | A1 | 9/2005 | Sull et al. |
| 2005/0198282 | A1 | 9/2005 | Stahl et al. |
| 2005/0234892 | A1 | 10/2005 | Tamura |
| 2005/0244137 | A1* | 11/2005 | Takashima ............. G11B 20/10 |
| | | | 386/234 |
| 2005/0262541 | A1 | 11/2005 | Oota |
| 2006/0037057 | A1 | 2/2006 | Xu |
| 2006/0120378 | A1 | 6/2006 | Usuki et al. |
| 2006/0126713 | A1 | 6/2006 | Chou et al. |
| 2006/0139379 | A1* | 6/2006 | Toma et al. ................... 345/698 |
| 2007/0003251 | A1 | 1/2007 | Chung et al. |
| 2007/0016657 | A1 | 1/2007 | Ito |
| 2007/0025687 | A1 | 2/2007 | Kim |
| 2007/0101164 | A1 | 5/2007 | Ando et al. |
| 2007/0177854 | A1 | 8/2007 | Ando et al. |
| 2007/0280641 | A1* | 12/2007 | Uchimura ....................... 386/95 |
| 2008/0037658 | A1* | 2/2008 | Price ..................... G10L 19/167 |
| | | | 375/240.26 |
| 2008/0040498 | A1 | 2/2008 | Setlur et al. |
| 2008/0069204 | A1 | 3/2008 | Uchiike |
| 2008/0109532 | A1 | 5/2008 | Denoual et al. |
| 2008/0177865 | A1 | 7/2008 | Heo et al. |
| 2008/0195743 | A1* | 8/2008 | Brueck et al. ............... 709/231 |
| 2008/0215317 | A1* | 9/2008 | Fejzo ............................ 704/217 |
| 2008/0216135 | A1* | 9/2008 | Pfeffer ............... H04N 7/17318 |
| | | | 725/93 |
| 2008/0301380 | A1 | 12/2008 | Itho |
| 2009/0010273 | A1 | 1/2009 | Green et al. |
| 2009/0010615 | A1* | 1/2009 | Kawahara ............ G11B 27/105 |
| | | | 386/224 |
| 2009/0018681 | A1 | 1/2009 | Lee et al. |
| 2009/0031007 | A1 | 1/2009 | Boic et al. |
| 2009/0051811 | A1* | 2/2009 | Yoo et al. ...................... 348/468 |
| 2009/0055417 | A1 | 2/2009 | Hannuksela |
| 2009/0055547 | A1* | 2/2009 | Hudson et al. ............... 709/231 |
| 2009/0089535 | A1 | 4/2009 | Lohmar et al. |
| 2009/0097819 | A1 | 4/2009 | Dui et al. |
| 2009/0100496 | A1* | 4/2009 | Bechtolsheim ..... H04N 7/17336 |
| | | | 725/147 |
| 2009/0106288 | A1 | 4/2009 | Yang et al. |
| 2009/0110060 | A1 | 4/2009 | Cortes et al. |
| 2009/0141888 | A1 | 6/2009 | Kim et al. |
| 2009/0204487 | A1 | 8/2009 | Cansler et al. |
| 2009/0258594 | A1 | 10/2009 | Martin-Cocher et al. |
| 2009/0263103 | A1* | 10/2009 | Mae ..................... G11B 27/105 |
| | | | 386/248 |
| 2009/0300145 | A1 | 12/2009 | Musayev et al. |
| 2009/0300204 | A1* | 12/2009 | Zhang et al. ................. 709/231 |
| 2009/0323822 | A1* | 12/2009 | Rodriguez ......... H04N 21/4147 |
| | | | 375/240.25 |
| 2010/0046611 | A1 | 2/2010 | Tome et al. |
| 2010/0046924 | A1* | 2/2010 | Ikeda et al. ..................... 386/95 |
| 2010/0083339 | A1* | 4/2010 | Yoshii .................... H04H 20/06 |
| | | | 725/146 |
| 2010/0092148 | A1* | 4/2010 | Ogawa et al. ................... 386/44 |
| 2010/0118938 | A1* | 5/2010 | Fuchs et al. ............. 375/240.12 |
| 2010/0138489 | A1 | 6/2010 | Corley et al. |
| 2010/0189028 | A1* | 7/2010 | De Camargo ....... G11B 27/105 |
| | | | 386/248 |
| 2010/0205049 | A1* | 8/2010 | Long ...................... G06Q 30/02 |
| | | | 705/14.5 |
| 2010/0235472 | A1* | 9/2010 | Sood et al. ................... 709/219 |
| 2010/0262492 | A1* | 10/2010 | Bogestam et al. ......... 705/14.53 |

(56) References Cited

U.S. PATENT DOCUMENTS

| | | | |
|---|---|---|---|
| 2011/0022471 A1* | 1/2011 | Brueck | G06Q 30/02 705/14.61 |
| 2011/0022638 A1* | 1/2011 | Jiang | 707/797 |
| 2011/0029649 A1 | 2/2011 | Tian et al. | |
| 2011/0058675 A1* | 3/2011 | Brueck et al. | 380/277 |
| 2011/0080940 A1* | 4/2011 | Bocharov | H04N 21/4331 375/240.01 |
| 2011/0083144 A1* | 4/2011 | Bocharov et al. | 725/32 |
| 2011/0090953 A1* | 4/2011 | Melnyk et al. | 375/240.03 |
| 2011/0119394 A1 | 5/2011 | Wang et al. | |
| 2011/0277005 A1* | 11/2011 | Pedlow | H04L 63/0807 725/109 |
| 2013/0166765 A1* | 6/2013 | Kaufman | 709/231 |
| 2015/0256585 A1 | 9/2015 | Brueck et al. | |
| 2016/0323342 A1 | 11/2016 | Luby et al. | |

FOREIGN PATENT DOCUMENTS

| | | |
|---|---|---|
| CN | 1481643 A | 3/2004 |
| CN | 1559119 A | 12/2004 |
| CN | 1568620 A | 1/2005 |
| CN | 1575603 A | 2/2005 |
| CN | 1592418 A | 3/2005 |
| CN | 1625880 A | 6/2005 |
| CN | 1698378 A | 11/2005 |
| CN | 1764974 A | 4/2006 |
| CN | 1784652 A | 6/2006 |
| CN | 1787422 A | 6/2006 |
| CN | 1902865 A | 1/2007 |
| CN | 1985321 A | 6/2007 |
| CN | 1988547 A | 6/2007 |
| CN | 101014947 A | 8/2007 |
| CN | 101018323 A | 8/2007 |
| CN | 101247511 A | 8/2008 |
| CN | 1 01 321 265 A | 12/2008 |
| CN | 1 01 371 307 A | 2/2009 |
| CN | 101365128 A | 2/2009 |
| CN | 101459809 A | 6/2009 |
| CN | 101518027 A | 8/2009 |
| CN | 101521583 A | 9/2009 |
| EP | 1 043 892 A1 | 10/2000 |
| EP | 1395014 B1 | 6/2006 |
| EP | 2117143 A2 | 11/2009 |
| JP | 06-252876 A | 9/1994 |
| JP | 200013761 A | 1/2000 |
| JP | 2000-341640 A | 12/2000 |
| JP | 2001-024994 A | 1/2001 |
| JP | 2001-359081 A | 12/2001 |
| JP | 2003-087737 A | 3/2003 |
| JP | 2003-111048 A | 4/2003 |
| JP | 2003-235031 A | 8/2003 |
| JP | 2004-013283 A | 1/2004 |
| JP | 2004-88766 A | 3/2004 |
| JP | 2004-135307 A | 4/2004 |
| JP | 2004-140584 A | 5/2004 |
| JP | 2004-140654 A | 5/2004 |
| JP | 2004-516717 A | 6/2004 |
| JP | 2004-186890 A | 7/2004 |
| JP | 2004-215074 A | 7/2004 |
| JP | 2004-312304 A | 11/2004 |
| JP | 2004-328204 A | 11/2004 |
| JP | 2005-039667 A | 2/2005 |
| JP | 2005-073138 A | 3/2005 |
| JP | 2005-229153 A | 8/2005 |
| JP | 2005-303927 A | 10/2005 |
| JP | 2006-304232 A | 11/2006 |
| JP | 2006-311328 A | 11/2006 |
| JP | 2007-11584 A | 1/2007 |
| JP | 2007-25959 A | 2/2007 |
| JP | 2007-036666 A | 2/2007 |
| JP | 2007-518294 A | 7/2007 |
| JP | 2007-274142 A | 10/2007 |
| JP | 2008-97381 A | 4/2008 |
| JP | 2008-219267 A | 9/2008 |
| JP | 2008-236667 A | 10/2008 |
| JP | 2009-17345 A | 1/2009 |
| JP | 2009-134700 A | 6/2009 |
| JP | 2009-159625 A | 7/2009 |
| JP | 2013-505680 A | 2/2013 |
| KR | 10-0805308 B1 | 2/2008 |
| KR | 20080044524 A * | 5/2008 ............. H04N 7/173 |
| KR | 10-2008-0099629 A | 11/2008 |
| KR | 10-2009-0001707 A | 1/2009 |
| KR | 10-2009-0028017 A | 3/2009 |
| KR | 1020090036765 A | 4/2009 |
| KR | 1020090063775 A | 6/2009 |
| KR | 100920733 B1 | 10/2009 |
| KR | 10-2010-0007368 A | 1/2010 |
| WO | 02/49343 A1 | 6/2002 |
| WO | 2005/043783 A1 | 5/2005 |
| WO | 2006105158 A2 | 10/2006 |
| WO | 2007/095834 A1 | 8/2007 |
| WO | 2008/130191 A1 | 10/2008 |
| WO | 2009/119394 A1 | 10/2009 |
| WO | 2009/158344 A2 | 12/2009 |
| WO | 2008/062979 A1 | 4/2015 |

OTHER PUBLICATIONS

International Search Report issued by the International Searching Authority in counterpart International Application No. PCT/KR2011/001268 dated Nov. 25, 2011.

International Search Report dated Aug. 16, 2011 in counterpart international application No. PCT/KR2010/008060.

Written Opinion of the International Searching Authority dated Aug. 16, 2011 in counterpart international application No. PCT/KR2010/008060.

International Search report (PCT/ISA/210) dated Jul. 8, 2011 in the International Patent Application No. PCT/KR2010/008016.

International Search Report (PCT/ISA/210) dated Jul. 13, 2011 in the International Patent Application No. PCT/KR2010/008017.

International Search Report (PCT/ISA/210) dated Jul. 23, 2011 in the International Patent Application No. PCT/KR2010/008015.

International Search Report (PCT/ISA/210) dated Aug. 23, 2011 in the International Patent Application No. PCT/KR2010/008696.

International Search Report (PCT/ISA/210) dated Jul. 15, 2011 in the International Patent Application No. PCT/KR2010/008068.

International Search Report (PCT/ISA/210) and Written Opinion (PCT/ISA/237), dated Jul. 8, 2011, issued by the International Searching Authority in counterpart International Application No. PCT/KR2010/008016.

International Search Report (PCT/ISA/210) and Written Opinion (PCT/ISA/237), dated Nov. 3, 2011, issued by the International Searching Authority in counterpart International Application No. PCT/KR2011/001898.

Communication dated Feb. 7, 2014 issued by the European Patent Office in counterpart European Application No. 10830205.0.

Pantos R., et al., "HTTP Live Streaming; draft-pantos-http-live-straming-0.2.txt", Oct. 5, 2009, 20 pgs. total, XP015064407.

Alex Zambelli, "IIS Smooth Streaming Technical Overview", Mar. 31, 2009, 17 pgs. total, XP055009366.

Jin Young Lee et al., "DASH Evaluation Experiment #1: Compositions of Media Presentation (CMP) Proposal Comparison", Oct. 15, 2010, 56 pgs. total, XP030046599.

Wager Zia, "A few comments on LGE proposal about delivery of MPEG-2-TS", Oct. 15, 2010, 3 pgs. total, XP030047157.

Communication dated Feb. 12, 2014 issued by the European Patent Office in counterpart European Application No. 10830206.8.

Communication dated Feb. 12, 2014 issued by the European Patent Office in counterpart European Application No. 10830223.3.

Communication dated Feb. 25, 2014 issued by the European Patent Office in counterpart European Application No. 10830218.3.

Communication dated Mar. 4, 2014 issued by the European Patent Office in counterpart European Application No. 10830204.3.

Jaeyeon Song, et al., "Response to Call for Proposals for HTTP Streaming of MPEG Media standard", Jul. 30, 2010, 60 pgs. total, XP030046369.

(56) References Cited

OTHER PUBLICATIONS

Gerard Fernando, et al., "HTTP Streaming Solution—Response to Call for Proposal", Jul. 30, 2010, 32 pgs. total, XP030046346.
European Search Report dated Apr. 25, 2014 issued by the European Patent Office in counterpart European Application No. 10836186.6.
John A. Bocharov, "Smooth Streaming Technical Overview", CM-IPTV0560, Oct. 20, 2009, 18 pgs. total, XP017826991.
Communication dated Apr. 25, 2014 issued by the European Patent Office in counterpart European Application No. 11747701.8.
Communication dated Apr. 25, 2014 issued by the European Patent Office in counterpart European Application No. 11756585.3.
Communication dated Feb. 18, 2014 issued by the State Intellectual Property Office of P.R. China in counterpart Chinese Application No. 201080055449.8.
Communication dated Apr. 15, 2014 issued by the State Intellectual Property Office of P.R. China in counterpart Chinese Application No. 201080061413.0.
Communication dated May 22, 2014 issued by the European Patent Office in counterpart European Application No. 11790033.2.
Communication dated Jul. 2, 2014 issued by the State Intellectual Property Office of P.R. China in counterpart Chinese Application No. 201080061417.9.
Communication dated Jul. 3, 2014 issued by the State Intellectual Property Office of P.R. China in counterpart Chinese Application No. 201180010793.X.
Communication dated Jul. 1, 2014 issued by the Japanese Patent Office in counterpart Japanese Application No. 2012-538764.
Communication dated Jul. 15, 2014 issued by the Japanese Patent Office in counterpart Japanese Application No. 2012-538765.
Communication dated Aug. 27, 2014, issued by the State Intellectual Property Office of the People's Republic of China in counterpart Chinese Application No. 201080061494.4.
Communication dated Aug. 4, 2014, issued by the State Intellectual Property Office of the People's Republic of China in counterpart Chinese Application No. 201080061416.4
Communication dated Aug. 5, 2014, issued by the Japanese Patent Office in counterpart Japanese Application No. 2012-538771.
Communication dated Aug. 20, 2014, issued by the State Intellectual Property Office of the People's Republic of China in counterpart Chinese Application No. 201080061434.2.
Communication dated Aug. 5, 2014, issued by the Japanese Patent Office in counterpart Japanese Application No. 2012-538768.
Communication dated Aug. 19, 2014, issued by the Japanese Patent Office in counterpart Japanese Application No. 2012-543023.
Communication dated Sep. 24, 2014, issued by the Japanese Patent Office in counterpart Japanese Application No. 2012-553824.
Communication from the Japanese Patent Office dated Mar. 23, 2015 in a counterpart Japanese application No. 2012-553824.
Communication from the State Intellectual Property Office of P.R. China dated Mar. 17, 2015 in a counterpart application No. 201080061417.9.
Communication from the Japanese Patent Office dated Apr. 13, 2015 in a counterpart Japanese application No. 2012-538771.
Communication from the Japanese Patent Office dated Feb. 2, 2015 in a counterpart Japanese application No. 2012-538765.
Communication from the Japanese Patent Office dated Apr. 6, 2015 in a counterpart Japanese application No. 2012-538764.
"Transparent End-to-End Packet-Switched Streaming Service (PSS); Protocols and Codecs (Release 9)", 3GPP TS 26.234, Mar. 2012, 188 pages total.
"Release 2 Specification HTTP Adaptive Streaming", Open IPTV Forum, Sep. 2010, 25 pages total.
Communication dated Nov. 3, 2014, issued by the State Intellectual Property Office of the People's Republic of China in counterpart Chinese Application No. 201180014696.8.
Communication dated Dec. 19, 2014, issued by the Japanese Patent Office in counterpart Japanese Application No. 2012-543023.
Communication dated Mar. 24, 2015 issued by European Patent Office in counterpart European Application No. 11756585.3.
Communication from the State Intellectual Property Office of P.R. China dated Dec. 4, 2015 in a counterpart Chinese application No. 201080061494.4.
S. Bradner, "Key words for use in RFCs to Indicate Requirement Levels", Network Working Group, Request for Comments: 2119, BCP: 14, Category: Best Current Practice, Harvard University, Mar. 1997, https://www.ietf.org/rfc/rfc2119.txt, pp. 1-3.
ETSI, "Digital Video Broadcasting (DVB); Specification for the use of Video and Audio Coding in Broadcasting Applications based on the MPEG-2 Transport Stream", ETSI TS 101 154 V1.9.1 (Sep. 2009), Technical Specification, pp. 1-163.
ETSI, "Digital Video Broadcasting (DVB); Transport of MPEG-2 TS Based DVB Services over IP Based Networks", ETSI TS 102 034 V1.3.1 (Oct. 2007), Technical Specification, pp. 1-128.
ITU-T, "Series H: Audiovisual and Multimedia Systems Infrastructure of audiovisual services—Transmission multiplexing and synchronization", Amendment 3: Transport of AVC video data over ITU-T Rec. H.222.0 | ISO/IEC 13818-1 streams, (Mar. 2004), ISO/IEC 13818-1:2000/Amd.3:2004 (E), International Telecommunication Union, total 26 pages.
International Standard, "Information technology—Coding of audio-visual objects—Part 12: ISO base media file format", ISO/IEC 14496-12:2005(E), Second edition Apr. 1, 2005, Corrected version Oct. 1, 2005, total 93 pages.
International Standard, "Information technology—Coding of audio-visual objects—Part 14: MP4 file format", ISO/IEC 14496-14:2003(E), First edition Nov. 15, 2003, total 18 pages.
International Standard, "Information technology—Coding of audio-visual objects—Part 15: Advanced Video Coding (AVC) file format", ISO/IEC 14496-15:2004(E), First edition Apr. 15, 2004, total 29 pages.
ITU-T, "Series H: Audiovisual and Multimedia Systems Infrastructure of audiovisual services—Coding of moving video", ITU-T Recommendation H.264, (Mar. 2005), International Telecommunication Union, total 382 pages.
International Standard, "Information technology—Generic coding of moving pictures and associated audio information—Part 2: Video", ISO/IEC 13818-2:2013(E), Third edition Oct. 1, 2013, total 13 pages.
ETSI, "Digital Video Broadcasting (DVB); Subtitling systems", ETSI EN 300 743 V1.3.1 (Nov. 2006), European Standard (Telecommunications series), pp. 1-51.
ETSI, "Digital Video Broadcasting (DVB); Specification for conveying ITU-R System B Teletext in DVB bitstreams", ETSI EN 300 472 V1.3.1 (May 2003), European Standard (Telecommunications series), pp. 1-11.
International Standard, "Information technology—Coding of audio-visual objects—Part 3: Audio", ISO/IEC 14496-3:2009(E), Fourth edition Sep. 1, 2009, total 18 pages.
ETSI, "Digital Audio Compression (AC-3, Enhanced AC-3) Standard", ETSI TS 102 366 V1.2.1 (Aug. 2008), Technical Specification, pp. 1-214.
International Telecommunication Union, "Terminal Equipment and Protocols for Telematic Services", Information Technology—Digital Compression and Coding of Continuous-Tone Still Images—Requirements and Guidelines, CCITT, Recommendation T.81, (Sep. 1992), ISO/IEC 10918-1 : 1993(E), total 186 pages.
International Standard, "Information technology—Coding of audio-visual objects—Part 2: Visual", ISO/IEC 14496-2:2004(E), Third edition Jun. 1, 2004, total 18 pages.
ETSI, "Universal Mobile Telecommunications System (UMTS); LTE; Transparent end-to-end Packet-switched Streaming Service (PSS); Protocols and codecs (3GPP TS 26.234 version 9.7.0 Release 9)", ETSI TS 126 234 V9.7.0 (Jan. 2012), Technical Specification, total 191 pages.
ETSI, "Digital cellular telecommunications system (Phase 2+); Universal Mobile Telecommunications System (UMTS); LTE; Transparent end-to-end packet switchedstreaming service (PSS); 3GPP file format (3GP) (3GPP TS 26.244 version 9.0.0 Release 9)", ETSI TS 126 244 V9.0.0 (Jan. 2010), Technical Specification, total 54 pages.

(56) References Cited

OTHER PUBLICATIONS

Communication dated Jul. 9, 2015, issued by the State Intellectual Property Office of P.R. China in counterpart Chinese Application No. 201180014696.8.
Communication dated Aug. 13, 2015, issued by the State Intellectual Property Office of P.R. China in counterpart Chinese Application No. 201080061417.9.
Communication dated Aug. 5, 2015, issued by the State Intellectual Property Office of P.R. China in counterpart Chinese Application No. 201180027573.8.
Communication dated May 18, 2015, issued by the State Intellectual Property Office of the People's Republic of China in counterpart Chinese Application No. 201080061494.4.
Communication dated Apr. 27, 2015 issued by the Japanese Patent Office in counterpart Japanese Patent Application No. 2012-538768.
Chen, et al., "Response to the CfP on HTTP Streaming: Adaptive Video Streaming based on AVC", International Organization for Standardisation, MPEG Meeting, Jul. 26, 2010-Jul. 30, 2010, Issue No. M17909, pp. 1-20, Geneva, Switzerland, XP030046499.
Communication dated Apr. 1, 2016, issued by the State Intellectual Property Office of the People's Republic of China in counterpart Chinese Patent Application No. 201180027573.8.
Communication dated Apr. 25, 2016, issued by the European Patent Office in counterpart European Patent Application No. 10830204.3.
Communication dated May 9, 2016, issued by the European Patent Office in counterpart European Patent Application No. 11790033.2.
Anonymous, "OIPF Release 1 Specification Volume 2—Media Formats V 1.1" Open IPTV Forum, Oct. 8, 2009, 22 pages total.
Anonymous, "Open IPTV Forum—Functional Architecture—V 1.1" Open IPTV Forum, Jan. 15, 2008, 141 pages total.
Anonymous, "OIPF Release 1 Specification Volume 3—Content Metadata V 1.1", Open IPTV Forum, Oct. 8, 2009, 47 pages total.
Communication dated Oct. 3, 2016, issued by the Japanese Patent Office in counterpart Japanese Patent Application No. 2012-553824.
Communication dated Oct. 31, 2016, issued by the Korean Intellectual Property Office in counterpart Korean Patent Application No. 10-2010-0103721.
Communication dated Oct. 31, 2016, issued by the Korean Intellectual Property Office in counterpart Korean Patent Application No. 10-2010-0103722.
Communication dated Nov. 7, 2016, issued by the Japanese Patent Office in counterpart Japanese Patent Application No. 2015-167763.
Communication dated Dec. 19, 2016, issued by the Japanese Patent Office in counterpart Japanese Patent Application No. 2015-156368.
Alex Zambelli, "IIS Smooth Streaming Technical Overview", Microsoft Corporation, Mar. 2009, pp. 1-17.
Communication dated Jul. 15, 2016, issued by the Korean Intellectual Property Office in counterpart Korean application No. 10-2010-0103727.
Communication dated Aug. 15, 2016, issued by the Japanese Patent Office in counterpart Japanese application No. 2015-156368.
Communication dated Sep. 12, 2016, issued by the Japanese Patent Office in counterpart Japanese application No. 2012-538764.
Communication dated Aug. 1, 2016, issued by the State Intellectual Property Office of P.R. China in counterpart Chinese application No. 201080061494.4.
Communication dated Aug. 29, 2016, issued by the Japanese Patent Office in counterpart Japanese application No. 2015-159842.
Communication dated Aug. 29, 2016, issued by the Japanese Patent Office in counterpart Japanese application No. 2012-538771.
Qualcomm Incorporated, et al., "3GPP Adaptive HTTP Streaming", Proposal to MPEG HTTP Streaming, 93rd MPEG meeting, Geneva, XP030001643, Jul. 22, 2010, pp. 1-61.
Qualcomm Incorporated, "Adaptive HTTPStreaming: Usage of the 3GPP File Format", 3GPP TSG-SA4 AHI Meeting, SA-AHI172, Mar. 2-4, 2010, Aachen, Germany, XP050437444, pp. 1-8.
Communication dated Sep. 29, 2016, issued by the European Patent Office in counterpart European Application No. 11747701.8.
Qualcomm Incorporated, "Pseudo CR: Adaptive HTTP Streaming—Full Solution Proposal", 3GPP TSG-SA4 #57, S4-100060, Jan. 25-29, 2010, St Julians, Malta, URL:http://www.3gpp.org/ftp/tsg_sa/WG4_CODEC/TSGS4_57/Docs/S4-100060.zip, total 17 pages.
Communication dated Sep. 26, 2016, issued by the Japanese Patent Office in counterpart Japanese application No. 2015-146132.
Huawei Technologies Co., Ltd., "Live Content Support in Static HTTP Streaming", 3GPP TSG-SA4 #56, S4-090857, Nov. 9-13, 2009, Sophia-Antipolis, URL:http://www.3gpp.org/ftp/tsg_sa/WG4_CODEC/TSGS4_56/Docs/S4-090857.zip France, total 6 pages.
Communication dated Jan. 19, 2017, issued by the Korean Intellectual Property Office in counterpart Korean Patent Application No. 10-2010-0103725.
Communication dated Jan. 30, 2017, issued by the Japanese Patent Office in counterpart Japanese Patent Application No. 2015-146132.
Communication dated Feb. 21, 2017, issued by the Korean Intellectual Property Office in counterpart Korean Patent Application No. 10-2010-0103698.
Communication dated Mar. 15, 2017, issued by the Korean Intellectual Property Office in counterpart Korean Patent Application No. 10-2011-0011110.
Communication dated Mar. 28, 2017, issued by the State Intellectual Property Office of the People's Republic of China in counterpart Chinese Patent Application No. 201080061494.4.
Communication dated Sep. 29, 2018, issued by the China National Intellectual Property Administration in counterpart Chinese Application No. 201080061494.4.
Communication dated May 30, 2018, issued by the State Intellectual Property Office of P.R. China in counterpart Chinese Application No. 201080061494.4.

* cited by examiner

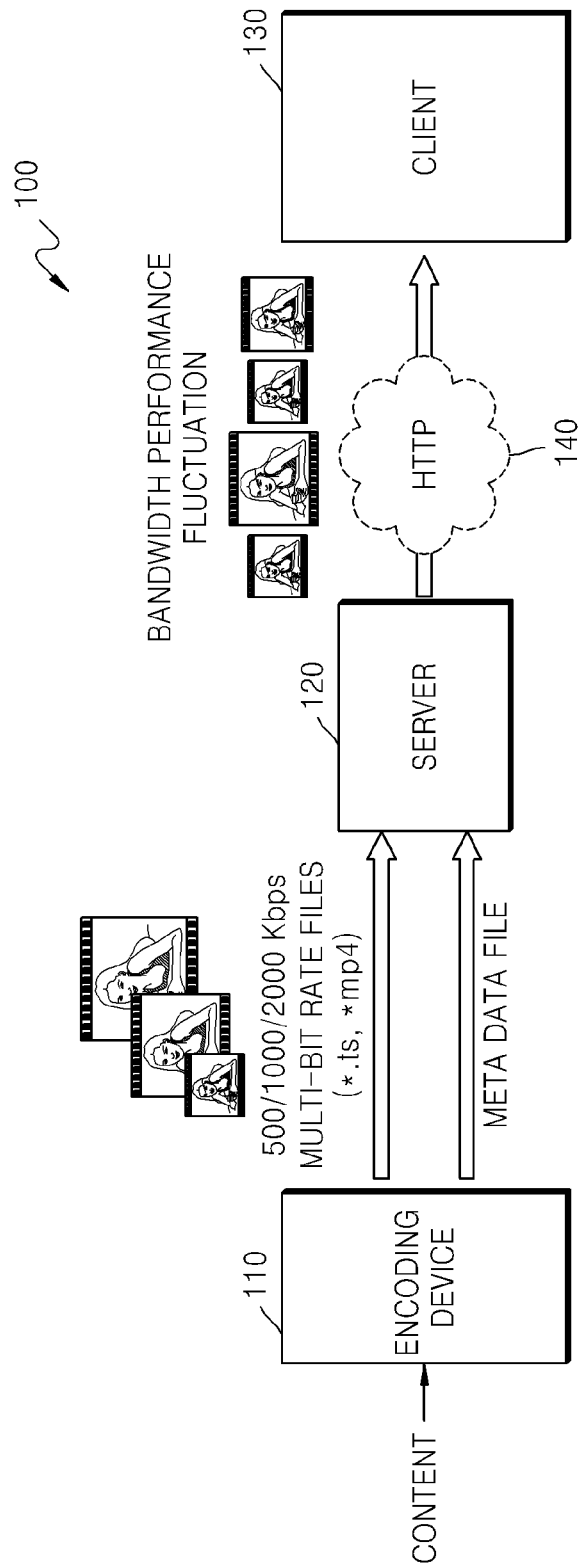

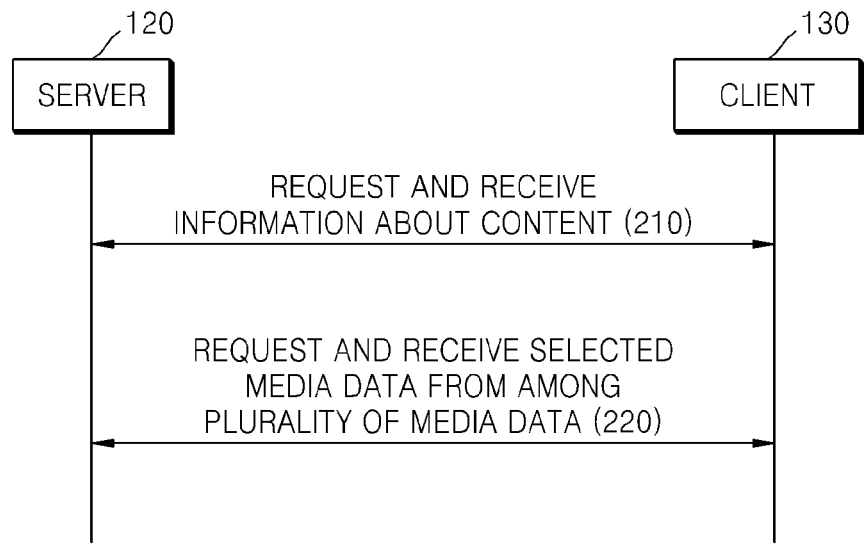
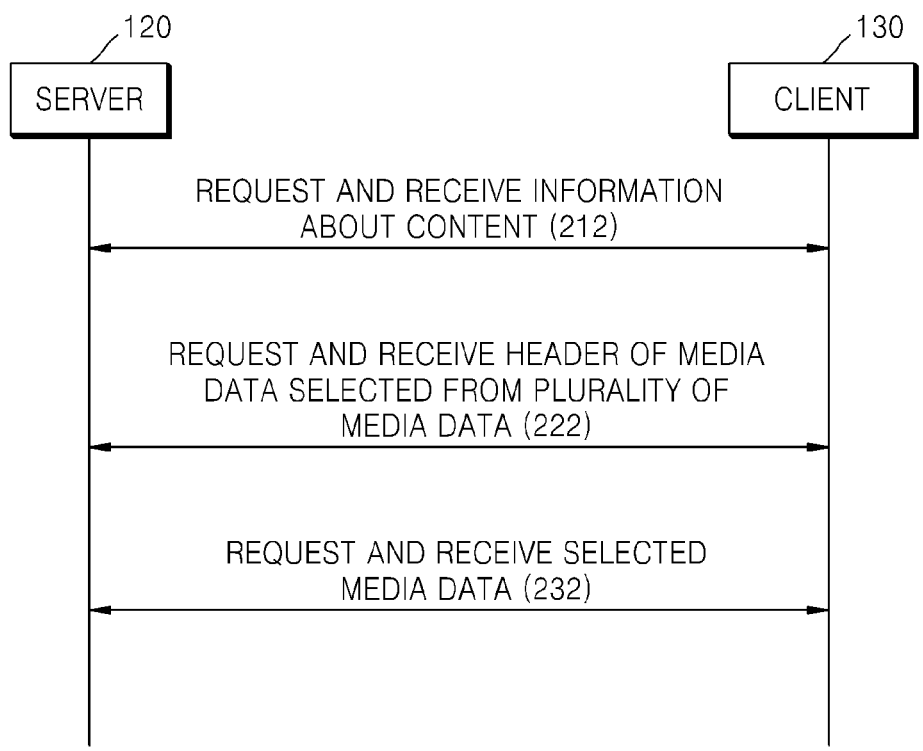

FIG. 4A

```
<Tracks>
    <Track ID="1" Type="Packed" BitRate="200000">
    <Track ID="2" Type="Video" BitRate="400000">
</Tracks>
```

FIG. 4B

```
<RefData Type="HEAD-TS" ID="1">
    <URL>http://www.altova.com/movie1/head1.ref</URL>
</RefData>
<RefData Type="HEAD-TS" ID="2">
    <URL>http://www.altova.com/movie1/head2.ref</URL>
</RefData>
```

FIG. 4C

```
<Fragments NextFragmentsXMLURL="http://www.altova.com/movie1/NextMeta.xml">
    <Fragment StartTime="14:20:00.0Z" Duration="00:00:02.0z" ID="1" BitRate="200000">
        <URL>http://www.altova.com/movie1/slice1-1.as</URL>
        <RefPointer>1</RefPointer>
    <Fragment StartTime="14:20:00.0Z" Duration="00:00:02.0z" ID="1" BitRate="400000">
        <URL>http://www.altova.com/movie1/slice2-1.as</URL>
        <RefPointer>2</RefPointer>
</Fragments>
```

FIG. 7

```
<ContentItem>
    <Title xml:lang="en-us">Example</Title>
    <Synopsis xml:lang="en-us">String</Synopsis>
    <OriginSite>http://asexample.com</OriginSite>
    <OriginStateName>Example</OriginSiteName>
    <ContentID>18888</ContentID>
    <ContentURL VideoCoding="AVC" Duration="14:20:00.00" Size="0" MediaFormat="MP4" DRMSystemID="12" MD5Hash=
    "String" MIMIType="video/MP4"TransferType="AS-CoD" AudioCoding="AAC">http://asexample.com/vod/movies/18888/
    Meta/MainMeta.xml</ContentURL>
    </ContestItem>
</Contents>
```

FIG. 9A

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header2.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Audio" Bitrate="64000" StartTime="00:00:00" SegmentDuration="00:00:30" SegmentStartID="1000" SegmentCount="120"/>
    <Track ID="5" Type="I-Frame" Bitrate="500000" StartTime="00:00:00" SegmentDuration="00:00:10" SegmentStartID="1000" SegmentCount="360"/>
</AdaptiveControl>
```

FIG. 9B

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:00:00" SegmentDuration="00:00:06" SegmentStartID="1000" SegmentCount="10"/>
    <Track ID="2" Type="Video" Bitrate="1000000" StartTime="10:00:00" SegmentDuration="00:00:06" SegmentStartID="1000" SegmentCount="10"/>
    <Track ID="3" Type="Video" Bitrate="2000000" StartTime="10:00:00" SegmentDuration="00:00:06" SegmentStartID="1000" SegmentCount="10"/>
    <Track ID="4" Type="Audio" Bitrate="64000" StartTime="10:00:00" SegmentDuration="00:00:30" SegmentStartID="1000" SegmentCount="2"/>
</AdaptiveControl>
```

FIG. 9C

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:01:00" SegmentDuration="00:00:06" SegmentStartID="1010" SegmentCount="10"/>
    <Track ID="2" Type="Video" Bitrate="1000000" StartTime="10:01:00" SegmentDuration="00:00:06" SegmentStartID="1010" SegmentCount="10"/>
    <Track ID="3" Type="Video" Bitrate="2000000" StartTime="10:01:00" SegmentDuration="00:00:06" SegmentStartID="1010" SegmentCount="10"/>
    <Track ID="4" Type="Audio" Bitrate="64000" StartTime="10:01:00" SegmentDuration="00:00:30" SegmentStartID="1010" SegmentCount="2"/>
</AdaptiveControl>
```

FIG. 9D

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="360"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9E

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:00" SegmentStartID="1000" SegmentCount="60"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9F

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:02:00" SegmentDuration="00:00:10" SegmentStartID="1000" SegmentCount="348"/>
    <Track ID="3" Type="Video" Bitrate="2000000" StartTime="00:02:00" SegmentDuration="00:00:10" SegmentStartID="1000" SegmentCount="348"/>
    <Track ID="4" Type="Video" Bitrate="3000000" StartTime="00:02:00" SegmentDuration="00:00:10" SegmentStartID="1000" SegmentCount="348"/>
    <Track ID="5" Type="Video" Bitrate="4000000" StartTime="00:02:00" SegmentDuration="00:00:10" SegmentStartID="1000" SegmentCount="348"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9G

```
<AdaptiveControl xsi:noNamespaceSchemaLocation="samsung_as.xsd" xmlns:xsi="http://www.w3.org/2001/XMLSchema-instance">
    <NextAdaptiveControlURL>http://asexample.com/live/movies/18888/Meta/NextMeta.xml</NextAdaptiveControlURL>
    <Track ID="1" Type="Packed" BitRate="500000">
        <Segment StartTime="00:00:00.00" Duration="00:02:00.00" ID="1000">
            <URL>http://ad_server.com/ad_for_adaptive/ad1.ts</URL>
        </Segment>
    </Track>
</AdaptiveControl>
```

FIG. 9H

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:00:00" SegmentDuration="00:00:06" SegmentStartID="1000" SegmentCount="10"/>
    <Track ID="2" Type="Video" Bitrate="1000000" StartTime="10:00:00" SegmentDuration="00:00:06" SegmentStartID="1000" SegmentCount="10"/>
    <Track ID="3" Type="Video" Bitrate="2000000" StartTime="10:00:00" SegmentDuration="00:00:06" SegmentStartID="1000" SegmentCount="10"/>
    <Track ID="4" Type="Audio" language="EN" Bitrate="64000" StartTime="10:00:00" SegmentDuration="00:00:30" SegmentStartID="1000" SegmentCount="2"/>
    <Track ID="5" Type="Audio" language="KR" Bitrate="64000" StartTime="10:00:00" SegmentDuration="00:00:30" SegmentStartID="1000" SegmentCount="2"/>
    <Track ID="6" Type="Subtitle" language="EN" Bitrate="0" StartTime="10:00:00" SegmentDuration="00:00:30" SegmentStartID="1000" SegmentCount="2"/>
    <Track ID="7" Type="Subtitle" language="KR" Bitrate="0" StartTime="10:00:00" SegmentDuration="00:00:30" SegmentStartID="1000" SegmentCount="2"/>
</AdaptiveControl>
```

METHOD AND APPARATUS FOR ADAPTIVE STREAMING USING SEGMENTATION

CROSS-REFERENCE TO RELATED PATENT APPLICATIONS

This application claims priorities from U.S. Provisional Application No. 61/260,906, filed on Nov. 13, 2009, U.S. Provisional Application No. 61/262,708, filed on Nov. 19, 2009, U.S. Provisional Application No. 61/267,131, filed on Dec. 7, 2009, U.S. Provisional Application No. 61/314,233, filed on Mar. 16, 2010, U.S. Provisional Application No. 61/318,916, filed on Mar. 30, 2010, U.S. Provisional Application No. 61/380,461, filed on Sep. 7, 2010, U.S. Provisional Application No. 61/380,477, filed on Sep. 7, 2010, in the U.S. Patents and Trademark Office, and Korean Patent Application No. 10-2010-0103721, filed on Oct. 22, 2010, in the Korean Intellectual Property Office, the disclosures of which are incorporated herein in their entireties by reference.

BACKGROUND

Field

One or more exemplary embodiments relate to streaming methods and apparatuses, and more particularly, to a method and apparatus for adaptively streaming media data according to fluctuations in a streaming environment.

Description of the Related Art

Examples of a method of transmitting media data through a network include a downloading method and a streaming method. In the streaming method, a server transmits media data in real time, and a client reproduces the received media data in real time.

Unlike the downloading method that starts to reproduce media data after transmitting and receiving the media data, since the streaming method transmits and receives the media data through a logical channel set between the server and the client, and reproduces the media data in real time, a method and apparatus for maintaining quality of service (QoS) in reproducing the media data by reflecting fluctuations in a streaming environment are required.

SUMMARY

One or more exemplary embodiments provide a method and apparatus for adaptively adjusting and performing streaming, i.e., for adaptively transmitting and receiving media data according to a streaming environment.

An exemplary embodiment also provides a computer readable recording medium having recorded thereon a program for executing the methods described herein.

According to an aspect of an exemplary embodiment, there is provided a method of receiving media data, the method including: receiving a file including information regarding a plurality of media data, which are generated by encoding content to have different qualities, from a server; and receiving at least one of the plurality of media data, based on the file. Each one of the plurality of media data includes at least one data segment generated by encoding the content to have a predetermined quality and dividing the content based on time. The at least one data segment starts with a random access point.

The plurality of media data may be media data in a MPEG-2 TS (MPEG-2 transport stream) format, and may correspond to elementary streams in the MPEG-2 TS format.

The at least one data segment may include at least one packetized elementary stream (PES). The at least one PES may be completely included in the at least one data segment.

The at least one PES may include data at least one video frame or one audio frame.

A transport stream of the random access point may include information indicating that the transport stream is related to the random access point.

The file may further include information pointing to at least one of a program association table (PAT) and a program map table (PMT) regarding the plurality of media data.

The PAT and the PMT may be initialization segments and may be separated from the plurality of media data.

At least one of the PAT and the PMT may include an entire list of the plurality of media data.

Different packet identifiers (PIDs) may be assigned to the plurality of media data.

The at least one data segment may include transport streams of at least one group of pictures (GOP).

The plurality of media data may be media data in an MP4 format, and may correspond to "trak" boxes in the MP4 format.

According to another aspect of an exemplary embodiment, there is provided a method of transmitting media data, the method including transmitting a file including information about a plurality of media data, which are generated by encoding content to have different qualities, to a client; and transmitting at least one of the plurality of media data to the client, in response to a request from the client based on the file. Each one of the plurality of media data includes at least one data segment generated by encoding the content to have a predetermined quality and dividing the content based on time. The at least one data segment starts with a random access point.

According to another aspect of an exemplary embodiment, there is provided an apparatus for receiving media data, the apparatus including an information receiver for receiving a file including information regarding a plurality of media data, which are generated by encoding content to have different qualities, from a server; and a media data receiver for receiving at least one of the plurality of media data, based on the file. Each one of the plurality of media data includes at least one data segment generated by encoding the content to have a predetermined quality and dividing the content based on time. The at least one data segment starts with a random access point.

According to another aspect of an exemplary embodiment, there is provided an apparatus for transmitting media data, the apparatus including an information transmitter for transmitting a file including information about a plurality of media data, which are generated by encoding content to have different qualities, to a client; and a media data transmitter for transmitting at least one of the plurality of media data to the client, in response to a request from the client based on the file. Each one of the plurality of media data includes at least one data segment generated by encoding the content to have a predetermined quality and dividing the content based on time. The at least one data segment starts with a random access point.

According to another aspect of an exemplary embodiment, there is provided a computer readable recording medium having recorded thereon a program for executing the above-described methods.

BRIEF DESCRIPTION OF THE DRAWINGS

The above and/or other aspects will become more apparent by describing in detail exemplary embodiments with reference to the attached drawings in which:

FIG. 1 is a diagram of a streaming system according to an exemplary embodiment;

FIGS. 2A and 2B are flowcharts for describing streaming methods according to exemplary embodiments;

FIG. 4A illustrates information for defining a plurality of media data, according to an exemplary embodiment;

FIG. 4B illustrates information about a header of media data, according to an exemplary embodiment;

FIG. 4C illustrates information about at least one segment included in each one of a plurality of media data, according to an exemplary embodiment;

FIG. 7 illustrates information about content according to another exemplary embodiment;

FIGS. 9A, 9B, 9C, 9D, 9E, 9F, 9G and 9H illustrate media presentation descriptions according to exemplary embodiments;

DETAILED DESCRIPTION OF EXEMPLARY EMBODIMENTS

Figure 3:
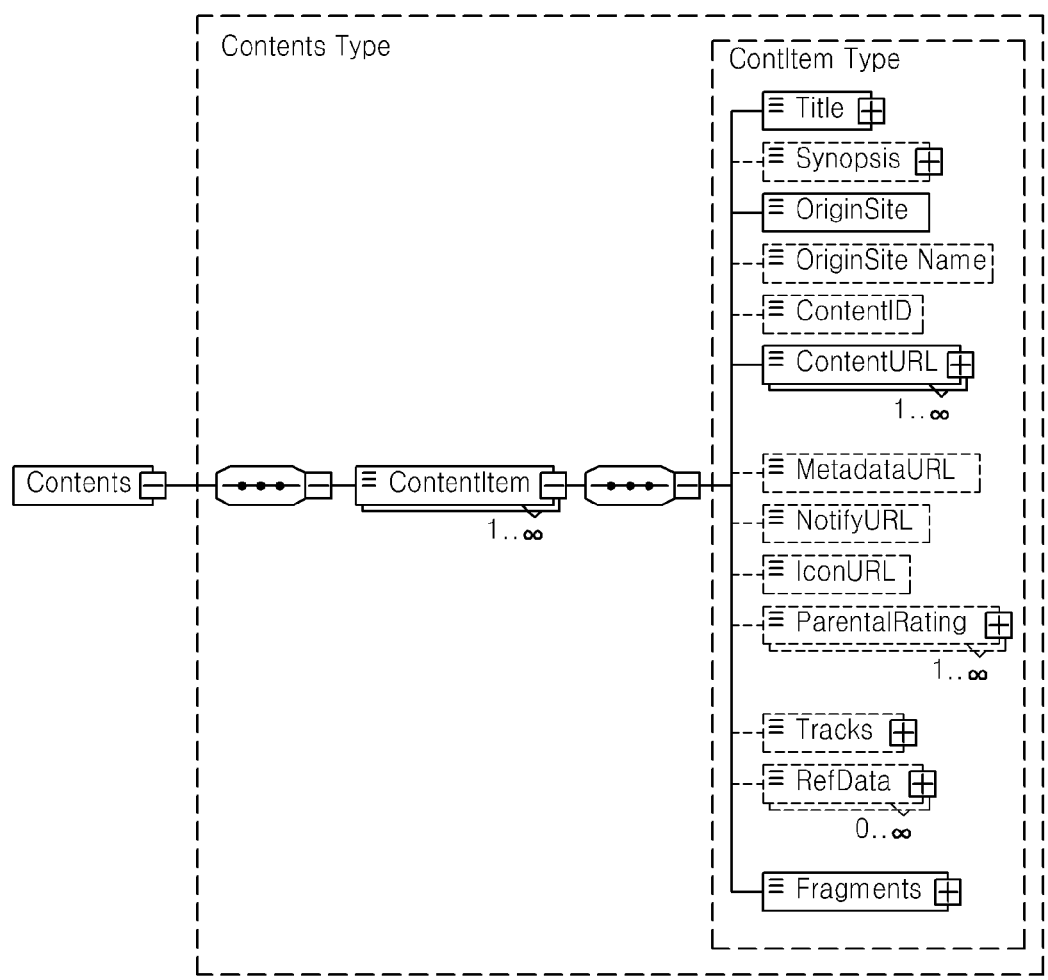
FIG. 3 is a schema of a file including information about content, according to an exemplary embodiment.

Hereinafter, exemplary embodiments will be described more fully with reference to the accompanying drawings, in which exemplary embodiments are shown. Expressions such as "at least one of," when preceding a list of elements, modify the entire list of elements and do not modify the individual elements of the list.

FIG. 1 is a diagram of a streaming system 100 according to an exemplary embodiment. Referring to FIG. 1, the streaming system 100 according to the present exemplary embodiment includes an encoding device 110, a server 120, and a client 130.

The encoding device 110 generates a plurality of media data about one input content by encoding the input content to have a plurality of different qualities. A streaming environment may change when the server 120 streams media data to the client 130. For example, a bandwidth of a network 140 for streaming may be changed, or a hardware source that may be used by the server 120 to transmit media data or by the client 130 to receive media data may be changed.

Accordingly, the encoding device 110 encodes one content to have different qualities for adaptive streaming according to a fluidic streaming environment. One content may be encoded to have different qualities by adjusting a factor, such as a bit rate, a sampling frequency, resolution, or a frame rate. For example, a plurality of media data in 500 Kbps, 1000 Kbps, and 2000 Kbps may be generated by encoding one image content in different resolutions.

The plurality of media data in different qualities are transmitted to the server 120, and at this time, information about the content and information about each media data may also be transmitted to the server 120. The information about the content may include, but is not limited to, information about a title, a synopsis, a content identifier (ID), and a content uniform resource locator (URL) of the content as metadata of the content. The information about each media data may include a quality, a type, an ID, or the like of each media data, and will be described in detail with reference to FIGS. 4A, 4B and 4C.

The client 130 receives at least one of the information about content and information about each media data, and requests the server 120 for at least one of the plurality of media data, based on the received at least one of the information about content and information about each media data. The client 130 estimates a streaming environment, and selects at least one of the plurality of media data based on the estimated streaming environment. The at least one media data that may maintain an optimum quality of service (QoS) in the estimated streaming environment may be selected. Then, the client 130 may transmit a hypertext transfer protocol (HTTP) request for requesting the server 120 to transmit the selected at least one media data.

When a streaming environment is deteriorated and high quality media data is received but continuous reproduction of media data is not possible, low quality media data may be requested from among a plurality of media data. When a streaming environment is improved and high quality media data is received and continuous reproduction of media data is possible, the high quality media data may continue to be requested from among a plurality of media data.

The client 130 may request the server 120 to transmit another media data while receiving a predetermined media data. For example, the client 130, which requested and was receiving first media data that is of low quality in a deteriorated streaming environment, may request the server 120 to transmit second media data that is of a higher quality than the first media data as the streaming environment improves. According to a conventional streaming method, when the server 120 and the client 130 sets a quality while initially setting a streaming channel, media data is continuously transmitted and received having the same quality. However, according to the present exemplary embodiment, streaming that is adaptive to the streaming environment is possible since the client 130 is able to request the second media data again even while receiving the first media data about the same content.

The client 130 may estimate a streaming environment by using any method of estimating a streaming environment based on the bandwidth of the network 140 or the hardware resource that may be used by the server 120 or the client 130. For example, the client 130 may estimate the streaming environment based on a time stamp and a bit error rate (BER) of received media data. The streaming environment may be determined to be deteriorated when media data is received slower than a reproduction speed by checking time stamps of the received media data. Alternatively, the streaming environment may be determined to be deteriorated when BERs of the received media data are increased.

When the client 130 requests the server 120 to transmit at least one of the plurality of media data according to the streaming environment, the server 120 transmits requested media data to the client 130. The server 120 may transmit the requested media data to the client 130 as an HTTP response to the HTTP request.

Each media data may include at least one of a plurality of segments generated by encoding content in different qualities and dividing the encoded content. In other words, each media data generated by encoding the content by the encoding device 110 may include at least one segment divided based on time. The server 120 transmits the content by dividing the content into the plurality of segments and respectively transmitting the plurality of segments, instead of encoding the content in one stream and continuously transmitting the content. The plurality of segments may be generated by dividing the content into predetermined time units, such as units of 10 or 20 seconds. The time that is the basis for dividing the content may be set based on a group of pictures (GOP). Media data corresponding to pictures of one or more GOPs may be set as one segment.

For example, when content is streamed having two qualities, the first media data may include at least one segment generated by encoding the content to have a first quality and dividing the encoded content based on time, and the second media data may include at least one segment generated by encoding the content to have a second quality and dividing the encoded content based on time.

The adaptive streaming is possible by dividing each media data based on time. For example, when streaming starts, the server 120 transmits a segment corresponding to 0 to 20 seconds of the first media data that is of low quality. Then, when it is determined that the streaming environment is improved after 20 seconds and the client 130 requests media data that is of higher quality, the server 120 may transmit a segment corresponding to 20 to 40 seconds of the second media data that is of the higher quality. Since media data is divided into a plurality of segments based on time, segments of different plurality of media data may be transmitted according to a streaming environment, even during streaming.

Figure 15A:
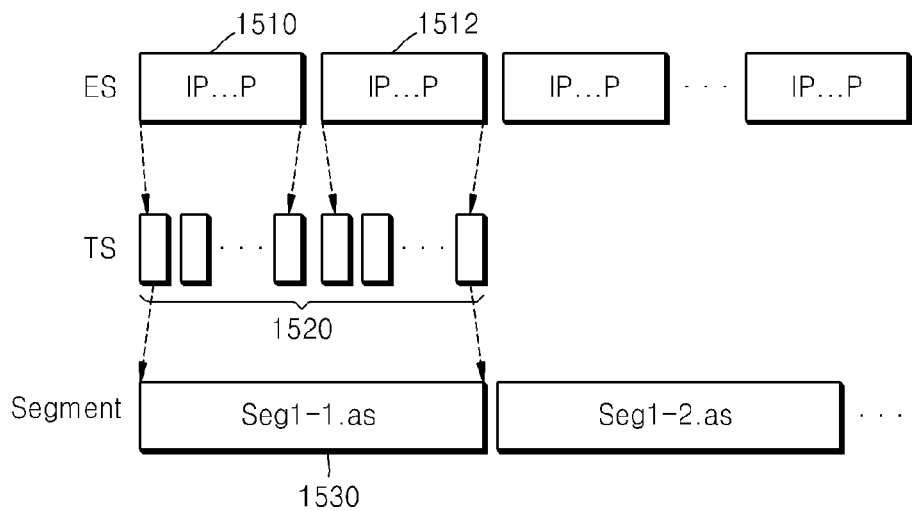
FIGS. 15A and 15B illustrate a method of segmenting MPEG-2 TS (transport stream) media data according to an exemplary embodiment.
Figure 15B:
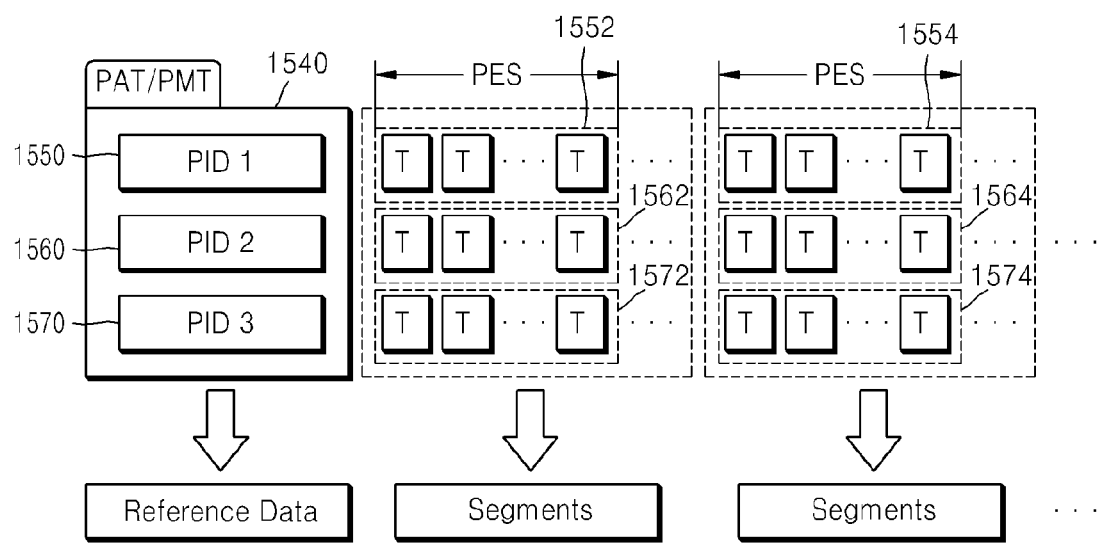

FIGS. 15A and 15B illustrate a method of segmenting MPEG-2 TS (transport stream) media data into segments according to an exemplary embodiment. The exemplary embodiments of FIGS. 15A and 15B will be described related to, for example, a case where a container format of the media data is an MP4 format or an MPEG-TS format. However, the container format according to an exemplary embodiment is not limited to the MP4 format or the MPEG-TS format, and it is understood that an exemplary embodiment may also be applied to the other various container formats for transmitting media data. For example, the container format may be a format according to the MPEG Media Transport standards.

Referring to FIG. 15A, if the media data is video data, an elementary stream may contain data about a plurality of pictures. The data about the plurality of pictures may be grouped based on Groups of Pictures (GOPs). Each of the GOPs starts with an intra picture, i.e., a picture that does not refer to any picture for prediction encoding. The intra picture may be used as a random access point since it does not refer to any picture for prediction encoding. A GOP is just an example of a unit in which video data is segmented into a plurality of segments, and it is understood that according to an exemplary embodiment one of the other units may be used to segment the media data in the method of FIG. 15A.

The data about the plurality of pictures is segmented into a plurality of transport streams in an MPEG2-TS format, and the plurality of transport streams are grouped into one segment. Since the segment is generated by grouping the plurality of transport streams, the start and end of the segment coincide with borders of a packet of a first transport stream and a packet of a last transport stream, respectively. In other words, the segment consists of the plurality of transport streams.

Referring to FIG. 15A, one segment 1530 of media data includes a plurality of transport streams 1520 regarding two GOPs 1510 and 1512, and the segment 1530 is generated in units of GOPs. Thus, each of segments of the media data starts with an intra picture, i.e., a random access point.

In the present exemplary embodiment, for streaming adaptive to a streaming environment, media data is segmented into at least one segment and at least one segment of a media data having a quality suitable to the streaming environment is transmitted. For this reason, the at least one segment may be reproduced separately, and thus, each of the at least one segment may start with a random access point. However, since in general, a GOP may start with an intra picture and the intra picture may be used as a random access point, one segment of media data is generated by grouping a transport stream regarding at least one GOP, as illustrated in FIG. 15A.

When a plurality of transport streams in the MPEG2-TS format are generated by segmenting data about one picture, each of the plurality of transport streams may contain the data about the picture. If a plurality of transport streams are generated by segmenting data regarding a plurality of pictures into equal segments, one of the plurality of transport streams may contain data regarding two pictures. In other words, if a plurality of transport streams are generated by segmenting data about a picture at a point in time t−1 and data about a picture at a point in time t into equal parts, not in consideration of the ends of the pictures, then a last transport stream of the picture at the point in time t−1 may contain both the data about the picture at the point in time t−1 and the data about the picture at the point in time t.

In adaptive streaming according to the present exemplary embodiment, the segment 1530 and the transport stream 1520 may be reproduced separately. For example, if the client 130 of FIG. 1 is reproducing the picture at the point in time t−1 and high-resolution pictures are to be reproduced starting from the point in time t, then media data having qualities different from that of media data for the picture at the point in time t−1 may be received starting from the point in time t. However, if a transport stream contains both the data about the picture at the point in time t−1 and the data about the point in time t, then borders of the media data are unclear, thereby lowering the effects of segmentation of the media data for adaptive streaming illustrated in FIG. 15A. Accordingly, when a plurality of transport streams are generated by segmenting an elementary stream, the plurality of transport streams may be generated in such a manner that a payload of each of the plurality of transport streams contains data about only one video frame. Also, a header of a first transport stream of one video frame may contain information indicating beginning of the video frame. This information may be "payload_start_unit_indicator" of a transport stream packet.

According to another exemplary embodiment, one transport stream may contain data about a plurality of pictures. In this case, adaptive streaming may be performed in units of pictures. That is, streaming may be performed while changing pictures having different qualities in consideration of a streaming environment.

If a transport stream is related to a random access point, a header of the transport stream may contain information indicating this fact. The header of the transport stream may also contain information indicating location of a transport stream related to a subsequent random access point so as to perform random access at high speeds.

A plurality of media data may be segmented according to the method of FIG. 15A, as illustrated in FIG. 15B. Referring to FIG. 15B, each of the plurality of media data may be segmented into segments including a plurality of transport streams, respectively.

The plurality of media data may correspond to a plurality of elementary streams, e.g., a plurality of elementary streams according to the MPEG-2 standard, respectively. In this case, different packet IDs (PIDs) 1550, 1560, and 1570 may be assigned to the plurality of media data, respectively. According to another exemplary embodiment, a plurality of media data may be generated by encoding one content, e.g., a program, to have different qualities and may thus be assigned the same PID. The elementary stream of FIG. 15A may be media data assigned a PID of 1, media data assigned a PID of 2, or media data assigned a PID of 3.

According to the MPEG-2 standard, Program Specific Information (PSI) is streamed together with media data, and a PID assigned to a transport stream containing the PSI has a fixed value. However, according to an exemplary embodiment, the PSI, such as a Program Association Table (PAT) and a Program Map Table (PMT), may be separated as a header of a plurality of media data, from payload data as illustrated in FIG. 15B. For example, referring to FIG. 15B, payload data of media data assigned a PID of 1 is segmented into segments according to the method of FIG. 15A, whereas the PSI, e.g., a PAT/PMT, may be present as a header for a plurality of media data in the form of a separate file. The PIDs 1550, 1560, and 1570 assigned to the PAT/PMT may have different values for the plurality of media data, respectively, so as to differentiate the plurality of media data from one another, or may have the same value for the plurality of media data because the plurality of media data are generated by encoding one content to have different qualities.

The header for all the plurality of media data, i.e., "Reference Data" in FIG. 15B, is an initialization segment and may be transmitted to the client 130 earlier than the other segments that include payload data, so as to start reproduction of the media data. In other words, header that the client 130 receives in operation 222 of FIG. 2B, operation 532 of FIG. 5B, and operation 1122 of FIG. 11B, which will be described in detail below, may be the "Reference Data" of FIG. 15B. The "Reference Data" may correspond to a header file 1050 of FIG. 10C or a header file 1250 of FIG. 12C, which will also be described in detail below.

Referring to FIG. 15B, when the plurality of media data correspond to a plurality of elementary streams, respectively, each of segments of the plurality of media data may include at least one consecutive Packetized Elementary Stream (PES). However, one PES may be included in only one segment from among the segments. As described above related to a transport stream, for adaptive streaming, one segment may be aligned with transport streams in the MPEG2-TS format. Thus, media data is segmented into segments in such a manner that one PES is included in only one segment. In other words, the same PES cannot be included in different segments. That is, one segment includes an integral number of PESs. Referring to FIG. 15B, PESs correspond to media data at the same point in time are included in the segment of the media data assigned the PID of 1, the media data assigned the PID of 2, and the media data assigned the PID of 3, respectively. Here, a PES may be a unit including a plurality of transport streams, and may thus include data about one video or audio frame or data about a plurality of video or audio frames. When data about one video or audio frame cannot be included in one PES, this data may be included in a plurality of PESs.

Also, a PES may include information for temporal synchronization of each of the plurality of media data, i.e., a time stamp. The time stamp may include time information about media data included in each PES. In particular, when a PES is generated by grouping transport streams based on time, all the transport streams included in the PES are related to media data at the same point in time. The time stamp may include at least one from among a Presentation Time Stamp (PTS) and a Decoding Time Stamp (DTS).

Time stamps of PESs included in the same type of a plurality of media data, e.g., a plurality of video data having different bit rates, or different types of a plurality of media data, e.g., video data and audio data, may be aligned based on reproduction time.

For example, if a first PES of first media data and a first PES of second media data are contents to be reproduced at the same point in time, then the same PTS and/or the same DTS may be assigned thereto. Referring to FIG. 15B, the same time stamp may be assigned to a PES 1552 of media data having the PID of 1, a PES 1562 of media data having the PID of 2, and a PES 1572 of media data having the PID of 3. Also, the same time stamp may be assigned to a PES 1554 of media data having the PID of 1, a PES 1564 of media data having the PID of 2, and a PES 1574 of media data having the PID of 3.

When the second media data is to be reproduced by switching from the first media data to the second media data during reproduction of the first media data, PTSs and/or DTSs thereof may be aligned consecutively for seamless reproduction. In other words, in this case, a PTS and/or a DTS of first PES after the switching may be aligned consecutively after a PTS and/or a DTS of a last PES before the switching.

Since segments of the media data are generated in units of PESs and PTSs and/or DTSs of the PESs are aligned consecutively based on time, start times of the segments may be recognized based on the PTSs and/or DTSs. Thus, segments of the first media data may be reproduced, and then, segments of the second media data may be reproduced consecutively when the switching is performed during reproduction of the first media data.

However, according to another exemplary embodiment, no time stamp may be assigned to a PES. That is, a time stamp may be selectively assigned to a PES. If a PES does not include time information, e.g., a time stamp, it is impossible to specify start times of segments of media data. This will be described in detail with reference to FIGS. 16A and 16B.

Figure 16A:
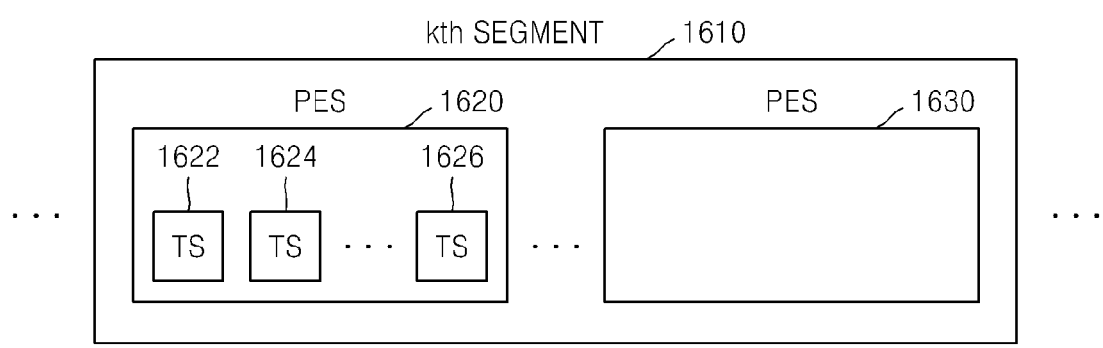
FIGS. 16A and 16B are block diagrams illustrating methods of inserting start time information into segments of media data, according to exemplary embodiments.
Figure 16B:
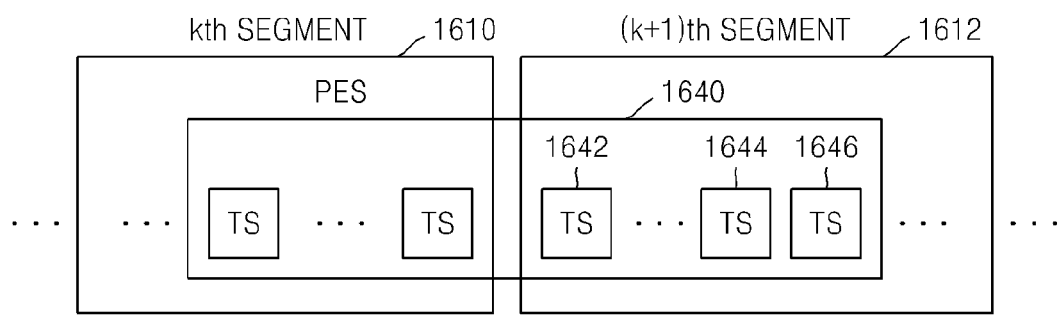

FIGS. 16A and 16B are block diagrams illustrating methods of inserting start time information into segments of media data, according to exemplary embodiments. In particular, FIGS. 16A and 16B illustrate methods of inserting time information into segments of media data when the media data is segmented into the segments as illustrated in FIG. 15B.

Referring to FIG. 16A, if each PES of media data does not include a PTS and/or a DTS, a first PES 1620, . . . , through a last PES 1630 included in a $k^{th}$ segment 1610 of media data also do not include a PTS and/or a DTS, and thus, a start time of the $k^{th}$ segment 1610 cannot be specified.

In this case, start times of segments of the media data cannot be specified, thus preventing adaptive streaming from being performed. As described above, segments of a plurality of media data should be reproduced seamlessly for adaptive streaming, but when each PES thereof does not include a PTS and/or a DTS, start times of the segments cannot be specified and the segments of the plurality of media data cannot be consecutively) reproduced. For example, if a $k^{th}$ segment of first media data and a $(k+1)^{th}$ segment of second media data are to be sequentially reproduced, it is impossible to consecutively reproduce the $k^{th}$ and $(k+1)^{th}$ segments when start time of the $(k+1)^{th}$ segment cannot be specified.

Thus, according to an exemplary embodiment, time information of each segment of media data may be contained in a transport stream. For example, a PTS and/or a DTS may be contained in a first transport stream of each segment of the media data. Referring to FIG. 16A, time information may be included in a first transport stream 1622 of the first PES 1620 of the $k^{th}$ segment 1610. Time information may be generated using the following syntax, and may be included as a field in a transport stream.

TABLE 1

| Syntax | Number of Bits |
|---|---|
| Segment_Index( ) { | |
| data_field_tag | 8 |
| data_field_length | 8 |
| PTS | 33 |
| DTS | 33 |
| PCR | 33 |
| } | |

In Table 1, "Segment_Index( )" for indexing each segment of media data is included into a "private_data_bytes" field of a transport stream, "data_field_tag" represents that the "private_data_bytes" field of the transport stream is related to indexing of each segment, and "data_field_length" defines a field length of the transport stream. At least one selected from among a PTS, a DTS, and a Program Clock Reference (PCR) may be included as time information.

It is understood that according to an exemplary embodiment "Segment_Index( )" may be included in a first transport stream 1622 of the first PES 1620 or may be included in another transport stream 1624 or 1626 of the first PES 1620.

As described above, one PES may be included in one segment of media data and may not be included in a plurality of segments of the media data. However, when one PES 1640 is included in both a $k^{th}$ segment 1610 and a $(k+1)^{th}$ segment 1612 of media data as illustrated in FIG. 16B, adaptive streaming may be performed by inserting time information into a first transport stream of the $(k+1)^{th}$ segment 1612.

Although the PES 1640 of FIG. 16B includes time information, e.g., a PTS and/or DTS, it is not also possible to specify start times of transport streams included in the $(k+1)^{th}$ segment 1612 when PES 1640 is included in both of the $k^{th}$ segment 1610 and the $(k+1)^{th}$ segment 1612, thereby preventing adaptive streaming from being performed.

Accordingly, the start times of the transport streams included in the $(k+1)^{th}$ segment 1612 may be specified by inserting "Segment_Index( )" into a first transport stream 1642 of the $(k+1)^{th}$ segment 1612.

It is understood that according to an exemplary embodiment "Segment_Index( )" may be inserted into the first transport stream 1642 of the $(k+1)^{th}$ segment 1612 or may be inserted into another transport stream 1644, . . . , or 1646 of the $(k+1)^{th}$ segment 1612.

FIGS. 16A and 16B illustrate methods of including time information when media data is segmented into segments in the MPEG-2 TS format, according to exemplary embodiments. However, time information may be included as described above with reference to FIG. 16A or 16B when media data is segmented into segments in the MP4 format, as will be described below in detail with reference to FIGS. 18A, 18B and 18C. For example, start time of each segment of media data may be specified by inserting "Segment_Index( )" into an MP4 box included in each segment of the media data.

Seamless reproduction may be impossible when PTSs and/or DTSs of PESs of a plurality of media data are not aligned according to reproduction time information. For example, when a first server produces first media data of content and a second server produces second media data of the content, PTSs and/or DTSs of PESs of the first and second media data may not be aligned according to reproduction time information.

For example, PTSs assigned to consecutive three segments of the first media data may be defined as '1000', '12000', and '13000', respectively, and PTSs assigned to consecutive three segments of the second media data, which can be reproduced at the same point in time that the first media data is reproduced, may be defined as '11000', '12000', and '13000', respectively. Since the PTS of the first segment of the first media data is '1000' and the PTS of the first segment of the second media data is '11000', it is difficult for a receiving side that receives the first and second media data to determine that the first segment of the first media data and the first segment of the second media data are reproduced at the same point in time. In this case, since the PTSs assigned to the first segment of the first media data and the first segment of the second media data are different from each other, it is impossible to perform adaptive streaming by changing the first and second media data.

Information for correcting such a problem may be generated based on the following syntax, and may be inserted into the above media presentation description or media data.

TABLE 2

| Syntax | Number of Bits |
|---|---|
| Segment_Start_Adjustment( ) { | |
| data_field_tag | 8 |
| wendidata_field_length | 8 |
| PTS | 33 |
| DTS | 33 |
| PCR | 33 |
| } | |

In Table 2, "Segment_Start_Adjustment( )" for time stamp adjustment is included into a "private_data_bytes" field of a transport stream, "data_field_tag" represents that the "private_data_bytes" field of the transport stream is used for time stamp adjustment, and "data_field_length" defines a field length of the transport stream. At least one from among a PTS, a DTS, and a PCR may be included as information for adjusting time stamps of segments of media data. "Segment_Start_Adjustment( )" is included in each of the segments of the media data. A time stamp of each of the segments of the media data is set according to the PTS, the DTS, or the PCR defined in "Segment_Start_Adjustment( )".

It is understood that according to an exemplary embodiment "Segment_Start_Adjustment( )" may be included in the first transport stream 1622 or another transport stream 1624, . . . , or 1626 of the first PES 1620, similar to "Segment_Index( )".

Also, an additional transport stream for time stamp adjustment may be defined separately at the head of the first PES 1620, and "Segment_Start_Adjustment( )" may be included in the additional transport stream.

The information for time stamp adjustment may also be included as described above when media data is segmented into segments according to the MP4 format, as will be described above with reference to FIGS. 18A, 18B and 18C below. For example, start time of each segment of media data may be specified by including "Segment_Start_Adjustment( )" into an MP4 box included in each segment. Otherwise, the information for time stamp adjustment may be included in a media presentation description.

The PTS and the DTS refer to, for example, time stamps of video data. As described above, time stamps of a plurality of media data for video data are aligned according to reproduction time of the media data. In case of audio data, time stamps may also be aligned according to reproduction time of the audio data. In other words, for adaptive streaming, time stamps of a plurality of media data for audio data may be aligned based on reproduction time as described above with reference to FIGS. 15B, 16A, and 16B.

Figure 17:
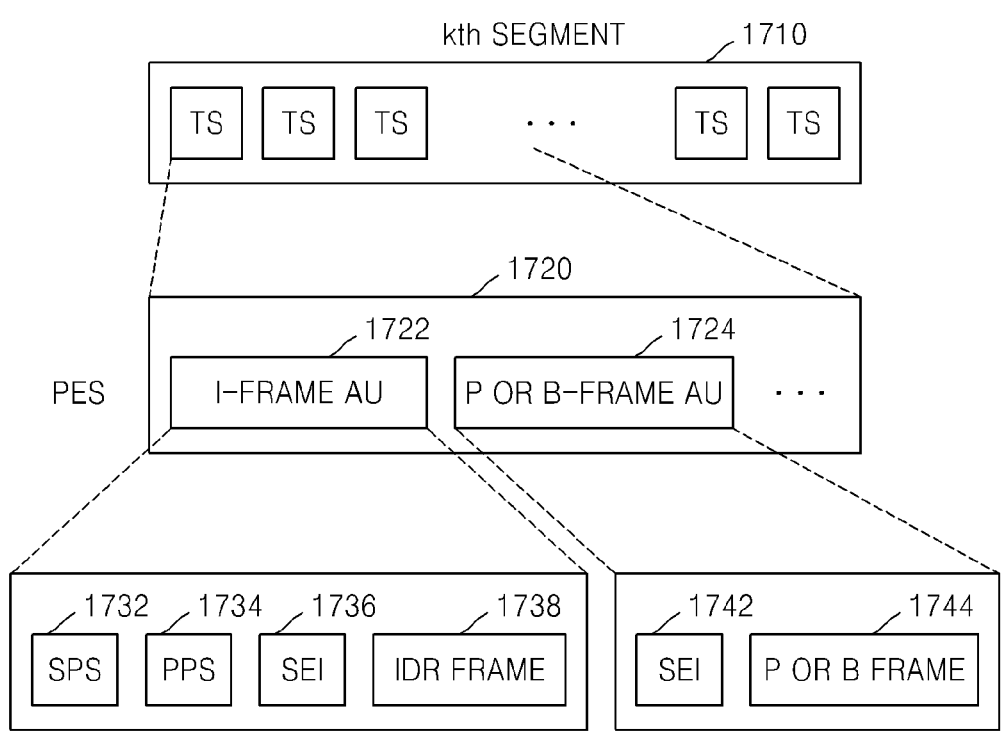
FIG. 17 is a block diagram of each segment of media data according to an exemplary embodiment.

FIG. 17 is a block diagram of each segment of media data according to an exemplary embodiment. Specifically, FIG. 17 illustrates a structure of each of segments of media data when the media data is segmented into the segments as illustrated in FIG. 15B. In FIG. 17, a $K^{th}$ segment 1710 is illustrated as an example so as to describe the structure of each of the segments of the media data, and the other segments may have this structure regardless of the order of the segments. As described above, each of segments of media data random access point may start with a random access point, e.g., an I-frame, so that the segments may be reproduced separately. FIG. 17 illustrates the structure of each of the segments of the media data, which start with the I-frame.

Referring to FIG. 17, the $K^{th}$ segment 1710 includes at least one PES, and a first PES 1720 of the $K^{th}$ segment 1710 starts with data about a random access point, e.g., the I-frame. A PES may be divided into access units (AUs) for accessing a bit stream in units of frames. Referring to FIG. 17, the first PES 1720 is divided into an I-frame access unit 1722 and a P or B-frame access unit 1724.

The I-frame access unit 1722 includes parameters for separately reproducing the segments of the media data, e.g., a Sequence Parameter Set (SPS) 1732, a Picture Parameter Set (PPS) 1734, and a Supplemental Enhancement Information (SEI) 1736. The SEI 1736 is a factor needed for Coded Picture Buffering (CPB). The I-frame access unit 1722 is a preceding frame from among frames included in the $K^{th}$ segment 1710, and includes an Instantaneous Decoding Refresh (IDR) frame 1738. The SPS 1732 and the PPS 1734 are included in a first byte of the I-frame access unit 1722, and the other access units of a video stream are provided after the SPS 1732 and the PPS 1734 are referred to.

The P or B-frame access unit 1724 includes an SEI 1742 and a P or B frame 1744. The SEI 1742 may be included in the P or B-frame access unit 1724 for the same purpose as the SEI 1736 in the I-frame access unit 1722.

For seamless reproduction considering a streaming environment, segments of a plurality of media data reproduced at the same point in time should have the same start times and durations. For example, in segments of a plurality of media data reproduced at the same point in time, the same PTS should be assigned to a first access unit and a last access unit.

Figure 18A:
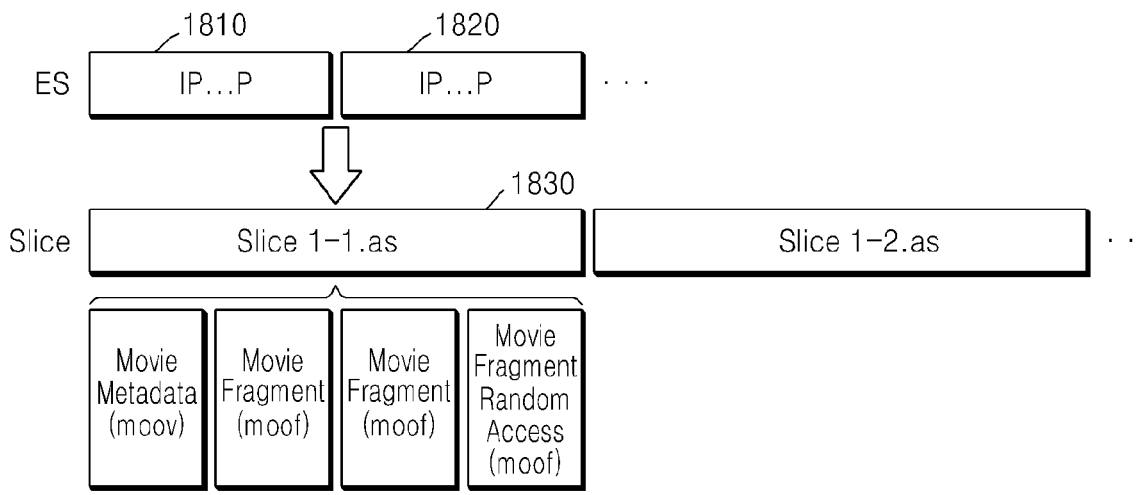
FIGS. 18A, 18B and 18C are block diagrams illustrating methods of segmenting MP4 media data according to an exemplary embodiment.
Figure 18B:
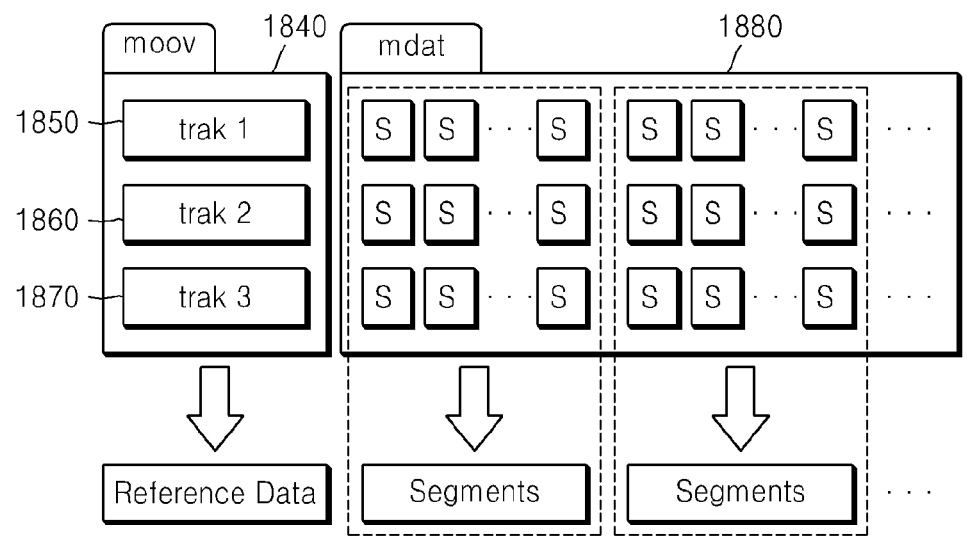
Figure 18C:
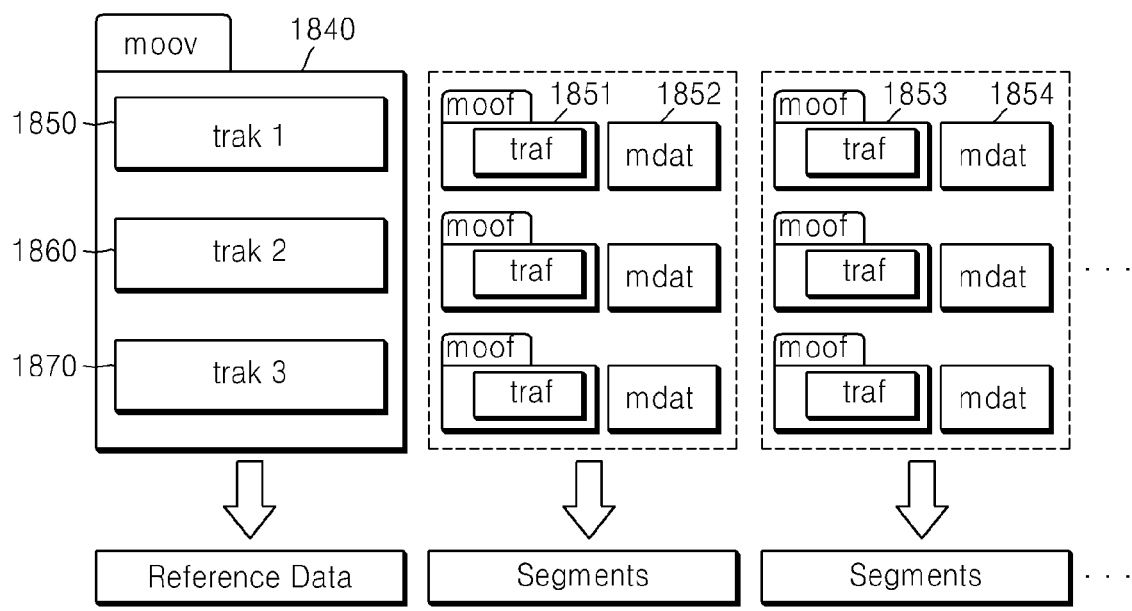

FIGS. 18A, 18B and 18C are block diagrams illustrating methods of segmenting media data into segments according to the MP4 format, according to exemplary embodiments. Referring to FIG. 18A, media data may be segmented into segments as described above with reference to FIG. 15A. As illustrated in FIG. 15A, if the media data is video data, an elementary stream thereof may include data about a plurality of pictures and may be divided into GOPs 1810 and 1820. Each of the GOPs 1810 and 1820 starts with an intra picture. In FIG. 18A, 'Slice' corresponds to 'Segment' of FIG. 15A.

In the exemplary embodiment of FIG. 18A, the two GOPs 1810 and 1820 are included in one segment 1830. A plurality of pictures included in the two GOPs 1810 and 1820 are included in the segment 1830 according to the MP4 format. Thus, the segment 1830 includes a 'moov' box containing header information of the media data, "moof" boxes containing payload data, and a "moof" box containing another header information of the media data, according to the MP4 format. Since one segment is generated based on GOPs, each of the segments of the media data starts with an intra picture, i.e., a random access point.

A plurality of media data may be segmented into segments as illustrated in FIG. 18B according to the method of FIG. 18A. Referring to FIG. 18B, a plurality of media data may be segmented into segments each including a plurality of samples.

The plurality of media data may correspond to a plurality of tracks "trak 1" 1850, "trak 2" 1860, and "trak 3" 1870 in the MP4 format, respectively. In this case, different "trak" IDs may be assigned to the plurality of media data, respectively.

According to an exemplary embodiment, a header of the plurality of media data may be separated as a "moov" box from payload data, as illustrated in FIG. 18B. Referring to FIG. 18B, similar to the "Reference Data" containing the PAT/PMT of FIG. 15B, the header containing metadata regarding the plurality of media data may be separated from a "mdat" box 1880 containing the payload data, and may be defined as a "moov" box 1840.

In FIG. 18B, the "moov" box 1840 is an initialization segment and may be transmitted to the client 130 of FIG. 1 earlier than the "mdat" box 1880 containing the payload data. Header information that the client 130 receives in operation 222 of FIG. 2B, operation 532 of FIG. 5B, and operation 1122 of FIG. 11B, may be the "moov" box 1840.

The other payload data except for the header information is included in the "mdat" box 1880. For example, in order to group and segment audio data into at least one segment, data regarding a plurality of audio samples corresponding to the plurality of tracks "trak 1" 1850 to "trak 3" 1870 may be grouped into one segment. A plurality of segments may be generated by grouping the audio samples corresponding to the track "trak 1" 1850 into predetermined temporal units, a plurality of segments may be generated by grouping the audio samples corresponding to the track "trak 2" into predetermined temporal units, and a plurality of segments may be generated by grouping the audio samples corresponding to the track "trak 3" in predetermined temporal units. For adaptive streaming, data regarding each of the plurality of audio samples may be included in only one segment. Headers of samples included in the "mdat" box 1880 are included in the plurality of tracks "trak 1" 1850 to "trak 3" 1870 included in the "moov" box 1840. Similarly, when video data is grouped according to the MP4 format, data regarding one GOP is included in only one segment.

FIG. 18C is a block diagram of a method of segmenting a plurality of media data into segments according to the MP4 format, according to another exemplary embodiment. FIG. 18B illustrates a case where payload data regarding a plurality of samples are grouped into predetermined temporal units by using the "mdat" box 1880, whereas FIG. 18C illustrates a case where payload data regarding a plurality of samples is segmented into segments by using a plurality of "moof" boxes and a plurality of "mdat" boxes. For example, when media data corresponding to a track "trak 1" 1850 from among the plurality of media data is segmented into segments as illustrated in FIG. 18C, a "moof" box 1851 and a "mdat" box 1852 are present for a first segment and a "moof" box 1853 and a "mdat" box 1854 are present for a second segment from among the segments.

The media data corresponding to the track "trak 1" 1850 may be segmented into segments, based on the "moof" box 1851 or 1853 containing metadata and the "mdat" box 1852 or 1854 containing payload data.

Here, each "moof" box may include a "traf" box containing metadata regarding samples, and data regarding one sample cannot be included in a plurality of segments as illustrated in FIG. 18B. For example, data regarding one sample may be included the "mdat" box 1852 for the first segment or the "mdat" box 1854 for the second segment, that is, it cannot be included in both the "mdat" box 1852 and the "mdat" box 1854.

FIG. 2A is a flowchart for describing a streaming method according to an exemplary embodiment. Referring to FIG. 2A, the client 130 transmits a request to the server 120 to transmit information about predetermined content, in operation 210. When a user of the client 130 selects the predetermined content from a user interface displayed on a screen of the client 130, the client 130 requests the server 120 to transmit information about the selected content. The client 130 may transmit an HTTP request requesting the server 120 to transmit information about predetermined content.

Upon receiving the request from the client 130, the server 120 transmits the information about the predetermined content to the client 130. The server 120 may transmit the information about the predetermined content as an HTTP response to the HTTP request to the client 130. The information about the predetermined content may be a content access descriptor (CAD) according to an open IPTV forum (OIPF) standard. The information about the predetermined content will now be described in detail with reference to FIG. 3.

FIG. 3 is a schema of a file including information about content, according to an exemplary embodiment. The file may be a CAD, and may be an eXtensible Markup Language (XML) file. A tag and an attribute are separately described, but it is understood that according to an exemplary embodiment an item defined by a tag can be defined by an attribute or an item defined by an attribute can be defined by a tag.

Referring to FIG. 3, the information about content may include "Title", "Synopsis", "OriginSite", and "ContentURL" tags.

Since conventional streaming of media data generates one media data by encoding one content to have a predetermined quality, conventional information (specifically, CAD according to OIPF) about content does not include information about a plurality of media data generated by encoding the content to have different qualities.

However, the information about content, according to the present exemplary embodiment, includes information about a plurality of media data generated by encoding one content to have different qualities, and corresponds to "Tracks", "RefData", and "Fragments" tags in FIG. 3.

FIG. 4A illustrates information for defining a plurality of media data, according to an exemplary embodiment. Referring to FIG. 4A, a "Tracks" tag is information for classifying a plurality of media data generated by encoding content to have different qualities. The "Tracks" tag includes an "ID" attribute, a "Type" attribute, and a "BitRate" attribute assigned to each media data.

The "ID" attribute defines identifiers sequentially given to the plurality of media data, and the "Type" attribute defines whether media data corresponds to audio data, video data, video/audio data, or subtitle data. When the "Type" attribute is "Packed", the media data is video/audio data, and when the "Type" attribute is "Video", the media data is video data. The "BitRate" attribute defines a bit rate used to encode the media data.

FIG. 4B illustrates information about a header of media data, according to an exemplary embodiment. Referring to FIG. 4B, a "RefData" tag includes a "Type" attribute and an "ID" attribute. The "Type" attribute defines a media format of a header. For example, when the "Type" attribute is "HEAD-TS", the header is a header of a transport stream format. The "ID" attribute defines a media data of a header. When the "ID" attribute is "1", the header is a header of media data having a media data ID of "1". Also, the "RefData" tag includes information pointing to a header, and an "URL" tag defines a location of a header, i.e., a URL of a header.

The "RefData" tag is a selective element. The "RefData" tag is included in information about content only when a header is separated from media data and exists as a separate file, and may not be included in the information about content when the header is combined with the media data.

FIG. 4C illustrates information about at least one segment included in each of a plurality of media data, according to an exemplary embodiment. Hereinafter, it is assumed that "Fragments" correspond to "Segment" illustrated in FIG. 15A or "Slice" illustrated in FIG. 15B.

Referring to FIG. 4C, a "Fragment" tag, which is a sub tag of a "Fragments" tag, includes the information about at least one segment included in each of the plurality of media data.

The "Fragments" tag includes a "NextFragmentsXMLURL" attribute. When following content is continuously streamed after streaming of one content is completed like in the case of live streaming, the following content may be seamlessly streamed only when the client 130 is aware of information about the following content. Accordingly, the "Fragments" tag defines the information about the following content as the "NextFragmentsXMLURL" attribute. URLs of the plurality of media data with respect to the following content may be defined as the "NextFragmentsXMLURL" attribute.

The "Fragment" tag includes information about at least one segment of current content. Referring to FIG. 4C, URL information of "slice1-1.as" constituting a first segment generated by encoding content in a first quality as first media data is defined by a "URL" tag, and an ID of a corresponding header is defined by a "RefPointer" tag. Also, a start time of the first segment is defined by a "StartTime" attribute, and a duration time of each segment is defined by a "Duration" attribute. A quality of the first media data is defined by a "BitRate" attribute.

In FIG. 4C, the "Fragments" tag shows each media data including only one segment. However, as described above with reference to FIG. 1, it is understood that according to an exemplary embodiment, when each media data is divided into a plurality of segments, one "Fragments" tag may include information about at least two segments.

Referring back to FIG. 2A, the client 130 requests the server 120 to transmit at least one of the plurality of media data, in operation 220. The plurality of media data are generated by encoding one content to have different qualities. The client 130 selects at least one media data encoded to have a quality suitable for a streaming environment from among the plurality of media data, and requests the server 120 for the selected at least one media data. The client 130 may transmit an HTTP request to the server 120 based on information about the plurality of media data, which is included in the information about the content.

As described with reference to FIG. 4C, the information about the content may include a "Fragments" tag. Accordingly, the client 130 requests the server 120 to transmit selected media data based on URL information included in the "Fragments" tag.

The server 120 transmits the media data according to the request of the client 130. The server 120 may transmit at least one segment of the requested media data to the client 130. The server 120 may transmit media data requested as an HTTP response with respect to an HTTP request to the client 130. The transmitted media data may be media data that is segmented into at least one segment as illustrated in one of FIGS. 15A, 15B, and 18A, 18B and 18C.

FIG. 2B is a flowchart for describing a streaming method according to another exemplary embodiment. Specifically, FIG. 2B illustrates the streaming method when a header exists as a separate file from media data.

Referring to FIG. 2B, the client 130 requests the server 120 to transmit information about predetermined content, in operation 212, and the server 120 transmits the information about content. Operation 212 corresponds to operation 210 of FIG. 2A. The information about content including the "RefData" tag described above with reference to FIG. 4B is received.

In operation 222, the client 130 requests a header of selected media data from among a plurality of media data, based on the information about content received in operation 212. At least one media data suitable for a streaming environment is selected from among the plurality of media data based on the information about content received in operation 212, and a header of the selected at least one media data is requested. The header of the selected at least one media data is requested by referring to the "RefData" tag included in the information about content received in operation 212.

The server 120 transmits the requested header to the client 130. A header file may be transmitted to the client 130, and may be an XML file. The header may be a header of all a plurality of media data, e.g., the "Reference Data" illustrated in FIG. 15B, 18B, or 18C.

In operation 232, the client 130 requests the server 120 to transmit selected media data based on the information about content received in operation 212 and the header received in operation 222. The client 130 requests the server 120 to transmit at least one segment generated by dividing media data based on time, and the server 120 transmits the requested at least one segment to the client 130. The transmitted media data may be media data that is segmented into at least one segment as illustrated in one of FIGS. 15A, 15B, and 18A, 18B and 18C.

Figure 5A:
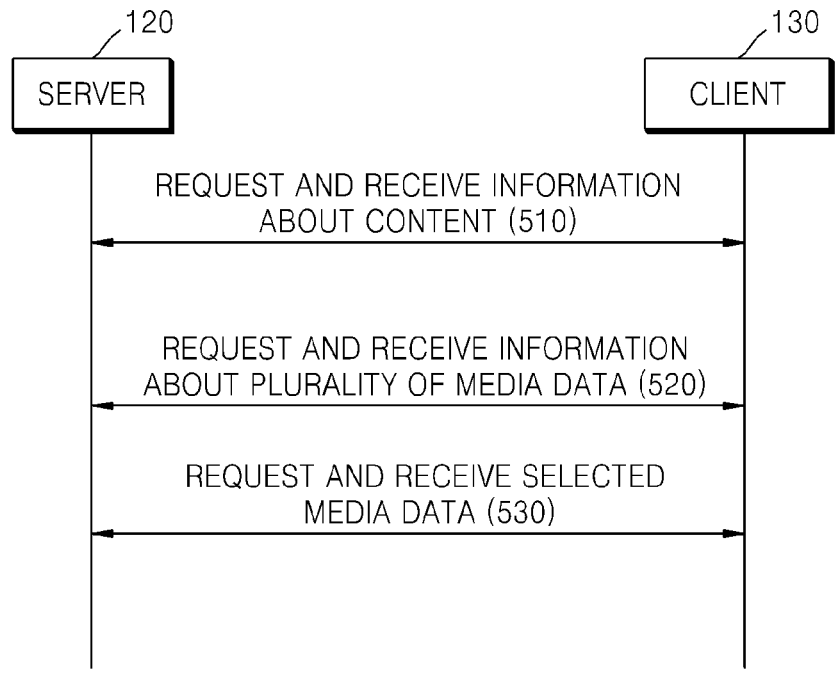
FIGS. 5A and 5B are flowcharts for describing streaming methods according to other exemplary embodiments.

FIG. 5A is a flowchart for describing a streaming method according to another exemplary embodiment. Referring to FIG. 5A, the client 130 requests the server 120 to transmit information about predetermined content, in operation 510, and the server 120 transmits the information about content. The client 130 transmits an HTTP request for requesting the server 120 to transmit the information about content, and receives the information about content as an HTTP response to the HTTP request. The information about content may be an XML file. The information about content received by the client 130 in operation 510 is different from the information about content received by client 130 in operation 210 of FIG. 2, and the difference will now be described with reference to FIGS. 6 and 7.

Figure 6:
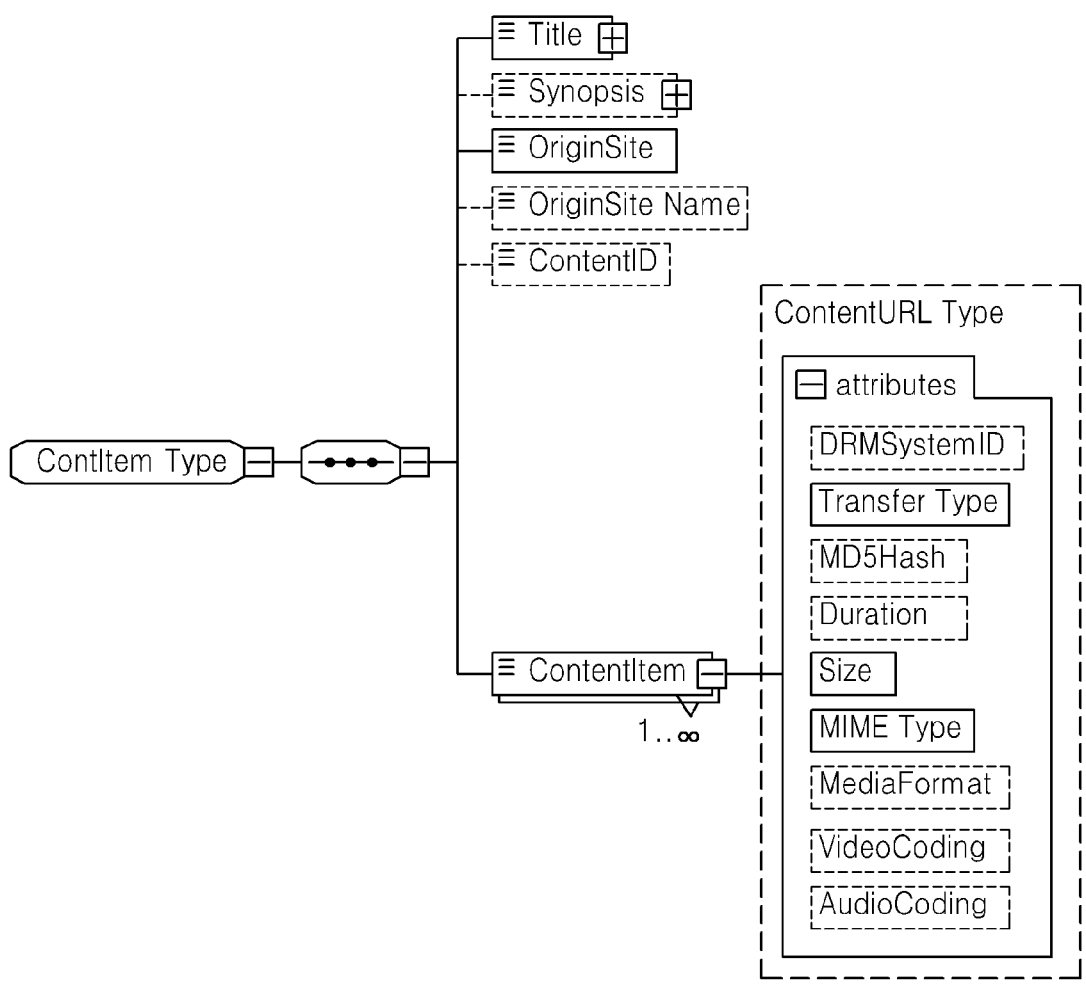
FIG. 6 is a schema of a file including information about content, according to another exemplary embodiment.

FIG. 6 is a schema of a file including information about content, according to another exemplary embodiment. Referring to FIG. 6, the information about content according to the present exemplary embodiment may include "Title", "Synopsis", "OriginSite", and "ContentURL" tags like FIG. 3.

However, in FIG. 3, the information about content includes the information about the plurality of media data by including the "Tracks", "RefData", and "Fragments" tags, whereas in FIG. 6, instead of including the information about the plurality of media data, the information about content only defines a URL of a file (hereinafter, referred to as a "media presentation description") including the information about the plurality of media data. The "ContentURL" tag may define the URL of the media presentation description.

Compatibility with various media data formats may be maintained while performing streaming that is adaptive to a streaming environment by inserting the URL of the media presentation description into the information about content as shown in FIG. 6, without largely changing conventional schema of the file containing the information about content.

As shown in FIG. 6, the information about content may only include information related to the streaming method, and not include the information about the plurality of media data. In other words, the "ContentURL" tag may include a "MediaFormat" attribute defining a format of media data used during streaming, and a "MIMEType" attribute defining a type of media data.

Specifically, the "ContentURL" tag may include a "TransferType" attribute defining a service to which streaming of content is related. The "TransferType" attribute may define whether the streaming of content is related to a Content on Delivery (CoD) service, a live service, an adaptive streaming live service, or an adaptive streaming CoD service.

FIG. 7 illustrates information about content according to an exemplary embodiment. FIG. 7 may be a CAD according to the OIPF standard. Referring to FIG. 7, the information about content generated according to the schema of FIG. 6 may define a URL of a media presentation description in a "ContentURL" tag. http://asexample.com/vod/movies/18888/Meta/MainMeta.xml is the URL of the media presentation description. Also, as described with reference to FIG. 6, the "MediaFormat" attribute, the "MIMEType" attribute, and the "TransferType" attribute may be defined in the "ContentURL" tag.

Referring back to FIG. 5A, in operation 520, the client 130 requests the server 120 for the information about the plurality of media data, based on the information about content received in operation 510. The client 130 may request a media presentation description to the server 120 through an HTTP request, and may receive the media presentation description as an HTTP response.

The information about content received by the client 130 from the server 120 in operation 510 may include the URL of the media presentation description as described with reference to FIGS. 6 and 7, and thus the client 130 requests and receives the media presentation description from the server 120 by referring to the "ContentURL" tag of the information about content. The media presentation description will now be described in detail with reference to FIGS. 8A and 8B, and FIGS. 9A, 9B, 9C, 9D, 9E, 9F, 9G and 9H.

Figure 8A:
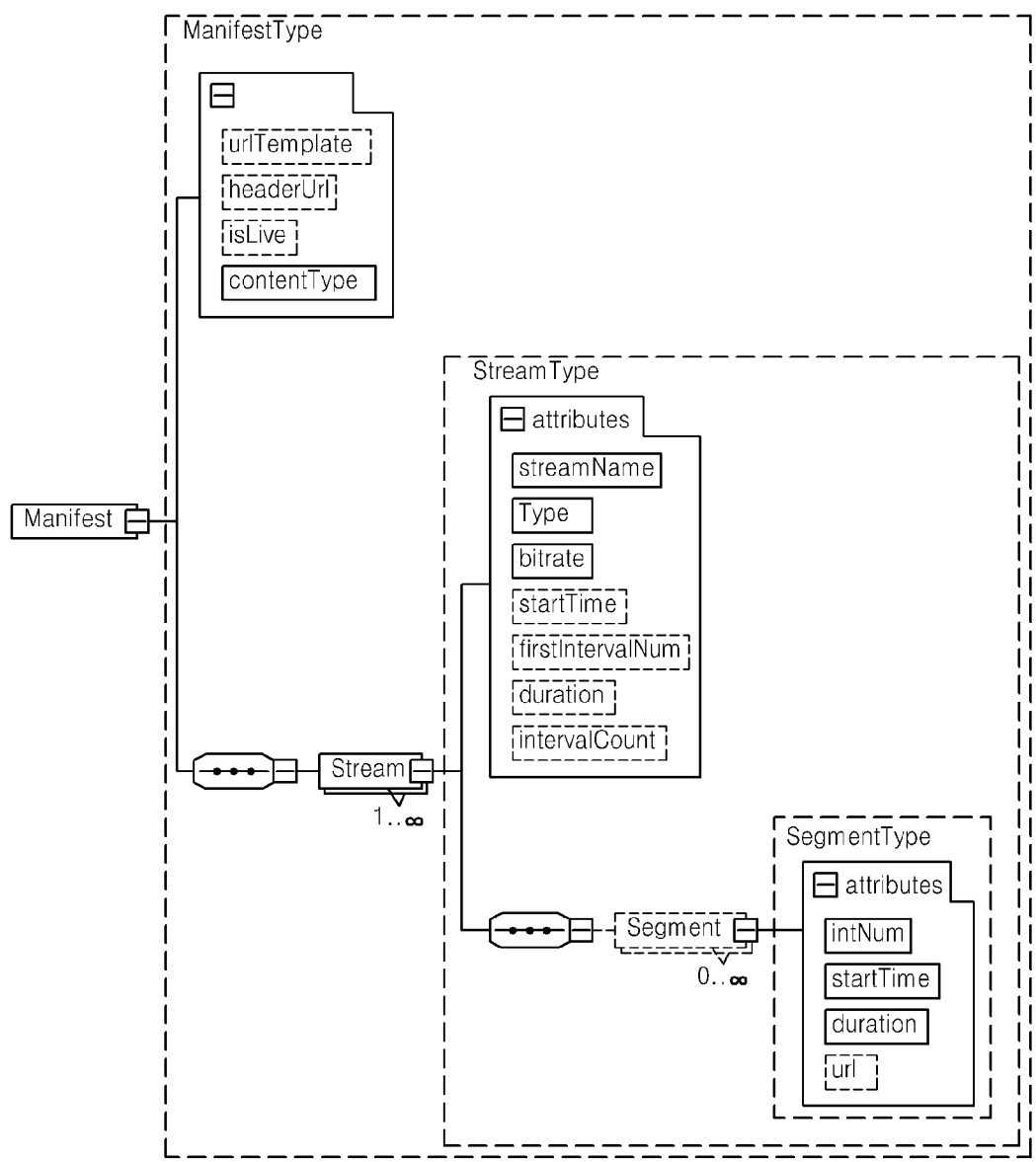
FIGS. 8A and 8B are schemas of a media presentation description according to exemplary embodiments.
Figure 8B:
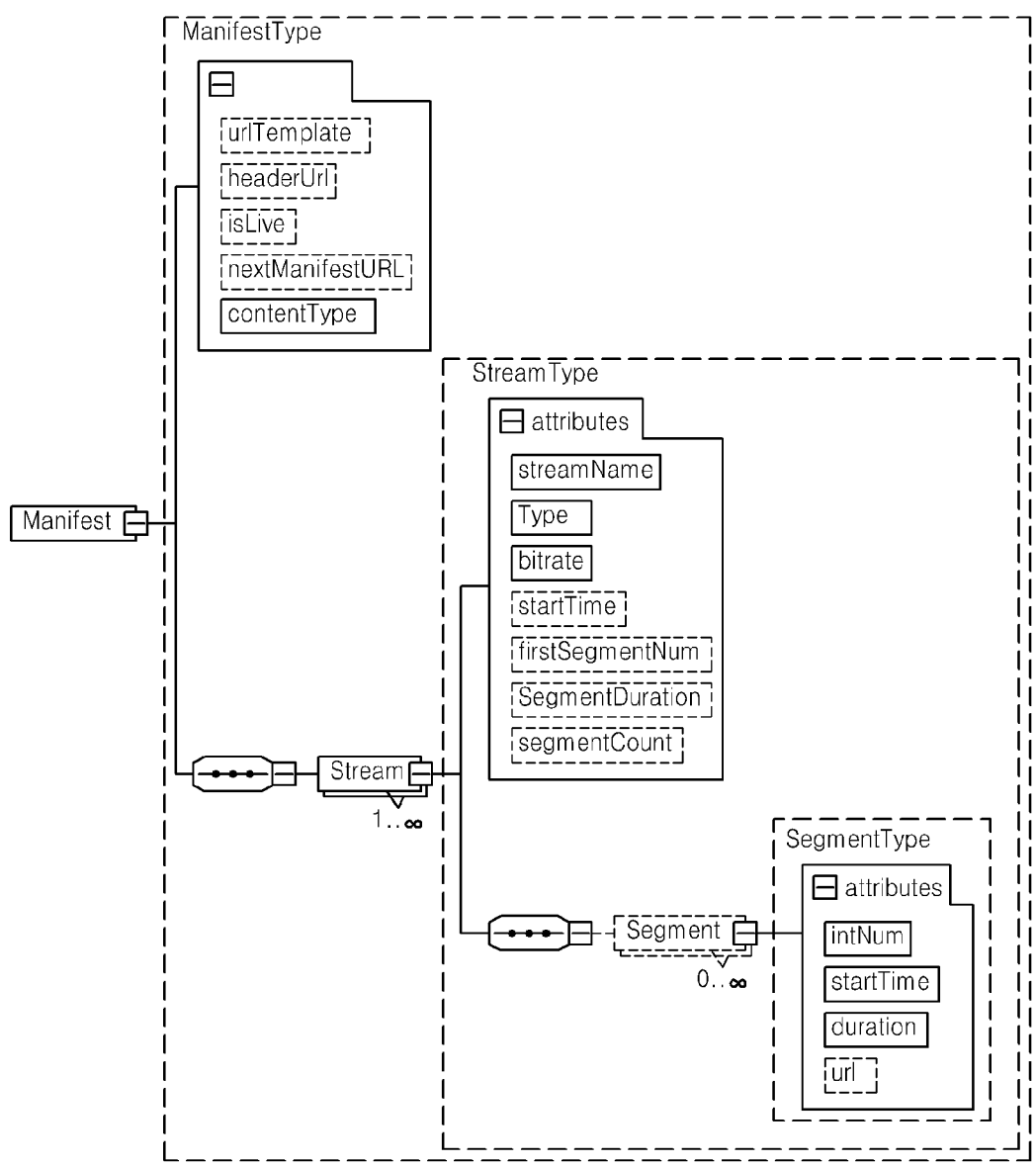

FIGS. 8A and 8B are schemas of a media presentation description according to exemplary embodiments. The media presentation description may comply with the OIPF standard.

Referring to FIG. 8A, the media presentation description according to the present exemplary embodiment includes a template tag about URLs of a plurality of media data, a tag for defining a location of a header, a tag for defining to which service the streaming is related to, a tag for defining a container format of media data, and a tag for defining the plurality of media data.

An "urlTemplate" tag defines a common portion of the URLs of the plurality of media data. For example, if "http://example.com/vod/movie/18888/Track/{TrackID}/Segments/{SegmentID}" is a URL template, a URL of media data may be defined by respectively substituting an ID of each media data and an ID of at least one segment included in each media data for "TrackID" and "SegmentID".

A "headerUrl" tag corresponds to the "RefData" tag described with reference to FIG. 4B. In other words, the "headerUrl" tag defines URLs of headers of the plurality of media data.

An "isLive" tag defines a service related to streaming. For example, when the "isLive" tag is defined as "Live", the streaming is related to a live service, and when the "is Live" tag is defined as "CoD", the streaming is related to a CoD service.

A "contentType" tag defines a container format of media data used during streaming. The "contentType" tag may indicate whether the container format is an MP4 format or an MPEG2-TS format. The container format is an MP4 format or an MPEG2-TS format herein, though it is understood that according to an exemplary embodiment the container format is not limited thereto, and any container format for transmitting media data may be used. For example, the "contentType" tag may define that the container format complies with an MPEG Media Transport (MMT) standard.

A "Stream" tag is generated for each media data and defines each media data. In order to define each media data generated by encoding one content to have different qualities, the "Stream" tag includes a "streamName" attribute, a "type" attribute, a "bitrate" attribute, a "startTime" attribute, a "firstIntervaNum" attribute, a "duration" attribute, and an "intervalCount" attribute.

The "streamName" attribute defines a name of media data, and may be an ID of media data. The "type" attribute defines a type of media data, wherein it is defined whether the media data is audio data, video data, or audio/video data. When media data only includes data about an I-frame for a trick play, such information may be defined in the "type" attribute.

The "bitrate" attribute defines a bit rate of media data, the "startTime" attribute defines a time stamp for specifying a start time of media data, and the "firstIntervaNum" attribute defines a number of a segment that initially starts.

The "duration" attribute defines a duration time of a segment included in media data, and the "intervalCount" attribute defines a total number of at least one segment included in media data.

The "Segment" tag is a sub tag of the "Stream" tag, and as described above, when media data includes at least one segment generated by encoding content in a predetermined quality and dividing the encoded content based on time, each of the at least one segment is defined.

The "IntNum" attribute defines a number of a segment, and the "StartTime" tag defines a start time of a corresponding segment. The "Duration" tag defines a duration time of a corresponding segment, and the "url" defines a URL of a corresponding segment.

The "Segment" tag is a selective tag, and may not be included in the media presentation description if the information about at least one segment included in the media data can be inferred from other attributes of the "Stream" tag. In other words, when content of the "Segment" tag can be inferred from the "startTime", "firstIntervaNum", "duration", and "intervalCount" attributes defined in the "Stream" tag, the "Segment" tag may not be included in the media presentation description. Also, a "url" attribute of the "Segment" tag may not be required if a predetermined template is defined in the "urlTemplate", and the URLs of segments are inferred by substituting each ID of the plurality of media data and an ID of at least one segment included in each media data with the defined predetermined template.

However, on the other hand, attributes of the "Segment" tag are separately defined for each segment, if the attributes of the "Segment" tag cannot be inferred from other attributes of the "Stream" tag. The attributes of the "Segment" tag may not be inferred if duration times of segments are different. When duration times are different, the duration times of segments included in media data cannot be inferred from the attributes of the "Stream" tag, and thus the duration times of the segments may be each set by using a "duration" attribute of the "Segment" tag. When the duration times of the segments are different, start times of continuous segments are also different. For example, when a duration time of a first segment of first media data is different from a duration time of a second segment of the first media data, a start time of the second segment and a start time of a third segment cannot be inferred from the "Stream" tag. Accordingly, a start time of each segment may be defined by a "startTime" attribute.

The duration times and/or start times may be defined by using a sub tag of the "Segment" tag, instead of using the "duration" attribute and the "startTime" attribute of the "Segment" tag. For example, a "Url" tag constituting a sub tag of the "Segment" tag may be set, and a duration time may be defined as an attribute of the "Url" tag, such as "<Url=www.example.com/~/segment.ts, duration=10/>".

According to another exemplary embodiment, duration time may be defined based on a difference between duration times of continuous segments. An upper tag may define a default duration time, and the "Url" tag constituting the sub tag may define only a difference between the default duration time and an actual duration time for each segment. As described above, the "Url" tag constituting the sub tag of the "Segment" tag may be defined as "<Url=www.example.com/~/segment.ts, duration=difference/>". "Difference" denotes a difference between the default duration time and the actual duration time.

When a default duration time of a corresponding segment is defined to be 10 minutes by using the "Stream" tag or the "Segment" tag, and the "Url" tag constituting the sub tag is defined to be "<Url=www.example.com/~/segment.ts, duration=2/>", a duration time of the corresponding segment may be defined to be 10+2=12 minutes.

Referring to FIG. 8B, the media presentation description according to another exemplary embodiment may further include a "nextManifestURL" tag. As described above, when following content is continuously streamed after streaming of one content is completed, such as in the case of live streaming or advertisement insertion, the client 130 requires to pre-know information about the following content so as to stream the following content ceaselessly. Accordingly, a URL of a media presentation description of the following content to be streamed after current content may be defined by the "nextManifestURL" tag.

FIGS. 9A, 9B, 9C, 9D, 9E, 9F, 9G and 9H illustrate media presentation descriptions according to exemplary embodiments. Referring to FIG. 9A, the media presentation description according to an exemplary embodiment includes a "URLTemplate" tag, a "RefDataURL" tag, and a plurality of tags respectively defining a plurality of media data.

The "URLTemplate" tag and the "RefDataURL" tag of FIG. 9A respectively correspond to the "urlTemplate" tag and the "RefDataURL" tag of FIGS. 8A and 8B.

An "ID" attribute, a "Type" attribute, a "BitRate" attribute, a "StartTime" attribute, a "SegmentDuration" attribute, a "SegmentStartID" attribute, and a "SegmentCount" attribute of FIG. 9A respectively correspond to the "streamName" attribute, the "type" attribute, the "bitrate" attribute, the "startTime" attribute, the "duration" attribute of the "Stream" tag, the "firstIntervalNum" attribute of the "Stream" tag, and the "intervalCount" attribute of FIGS. 8A and 8B.

The media presentation description of FIG. 9A includes information about three video data generated by encoding content to have different qualities, information about one audio data, and information about media data generated by encoding only I-frames for a trick play.

Referring to FIG. 9B, the media presentation description according to an exemplary embodiment further includes a "NextAdaptiveControlURL" tag. The "NextAdaptiveControlURL" tag corresponds to the "nextManifestURL" tag of FIG. 8B. Accordingly, a URL of a media presentation description of following content to be reproduced after current content may be defined by the "NextAdaptiveControlURL" tag.

FIG. 9C shows a media presentation description of the following content, when the URL of the media presentation description of the following content to be reproduced after the current content is defined by the "NextAdaptiveControlURL" tag of FIG. 9B. Comparing the media presentation descriptions of FIGS. 9B and 9C, a "StartTime" attribute is different from the media presentation description of the current content of FIG. 9B, since the media presentation description of FIG. 9C is for the following content.

FIGS. 9D and 9E illustrate media presentation descriptions for selectively controlling high quality video reproduction that a user want to perform. FIG. 9D illustrates the media presentation description when a plurality of media data are generated by encoding one content to have 5 different qualities. Here, the media presentation descriptions of FIGS. 9D and 9E are different in a tag including information about video encoded to have high quality, i.e., a "StartTime" attribute and a "SegmentCount" attribute of media data having an "ID" attribute of "5".

The server 120 selectively transmits the media presentation description of FIG. 9D or the media presentation description of FIG. 9E according to a user rating of the client 130. When the user rating of the client 130 is high (for example, when the client 130 is a paid user), the media presentation description of FIG. 9D is transmitted so that high quality video is freely reproduced, and when the user rating of the client 130 is low (for example, when the client 130 is a free user), the media presentation description of FIG. 9E is transmitted so that segments defined by the "SegmentCount" attribute are reproduced from a time defined by the "StartTime" attribute in high quality video.

FIG. 9F illustrates a media presentation description when a advertisement is inserted into content. Referring to FIG. 9F, the media presentation description may include information about advertisement content and main content, which have different "StartTime" attributes. The media presentation description may include information about advertisement content, which is reproduced from "00:00:00" to "00:02:00" at a bit rate of "500000", and information about main content, which is reproduced from "00:02:00" at bit rates of "1000000", "2000000", "3000000", or "4000000". The media presentation description of FIG. 9F may be transmitted from the server 120 to the client 130 if the server 120 provides the advertisement content to the client 130 by encoding the advertisement content to have one bit rate, and provides the main content, which has a different "StartTime" attribute from the advertisement content, to the client 130 by encoding the main content in four different bit rates.

FIG. 9G illustrates a media presentation description including information about advertisement content, according to an exemplary embodiment. A server for providing main content and a server for providing advertisement content may be different. In other words, when the client 130 receives the main content from the server 120 of FIG. 5A and receives the advertisement content from a server other than the server 120, the media presentation description of FIG. 9G may include a URL of the advertisement content. As shown in FIG. 9G, the media presentation description may include the URL of the advertisement content that is encoded to have one quality.

FIG. 9H illustrates a media presentation description including language and subtitle information, according to an exemplary embodiment. Referring to FIG. 9H, audio data may include information about multiple languages. The media presentation description may include information about audio data of multiple languages, wherein an "ID" attribute is "4" or "5", or information about subtitles of multiple languages, wherein the "ID" attribute is "6" or "7".

Since not only the audio data, but also the subtitle may be divided into a plurality of segments, based on time, the audio data and the subtitle may be changed to audio data and a subtitle of another language during streaming.

Referring back to FIG. 5A, the client 130 requests the server 120 to transmit at least one of the plurality of media data, in operation 530. The client 130 selects at least one media data that is encoded to have a quality suitable for the streaming environment by referring to the information about the plurality of media data, and requests the server 120 for the selected at least one media data. The client 130 may transmit an HTTP request for requesting the server 120 to transmit a predetermined media data. The server 120 transmits the media data according to the request of the client 130. Alternatively, the server may transmit at least one segment generated by encoding content to have a predetermined quality and dividing the encoded content based on time, to the client 130. The server 120 may transmit the requested media data to the client 130 as an HTTP response to the HTTP request. The transmitted media data may be media data that is segmented into at least one segment as illustrated in one of FIGS. 15A, 15B, and 18A, 18B and 18C.

Figure 5B:
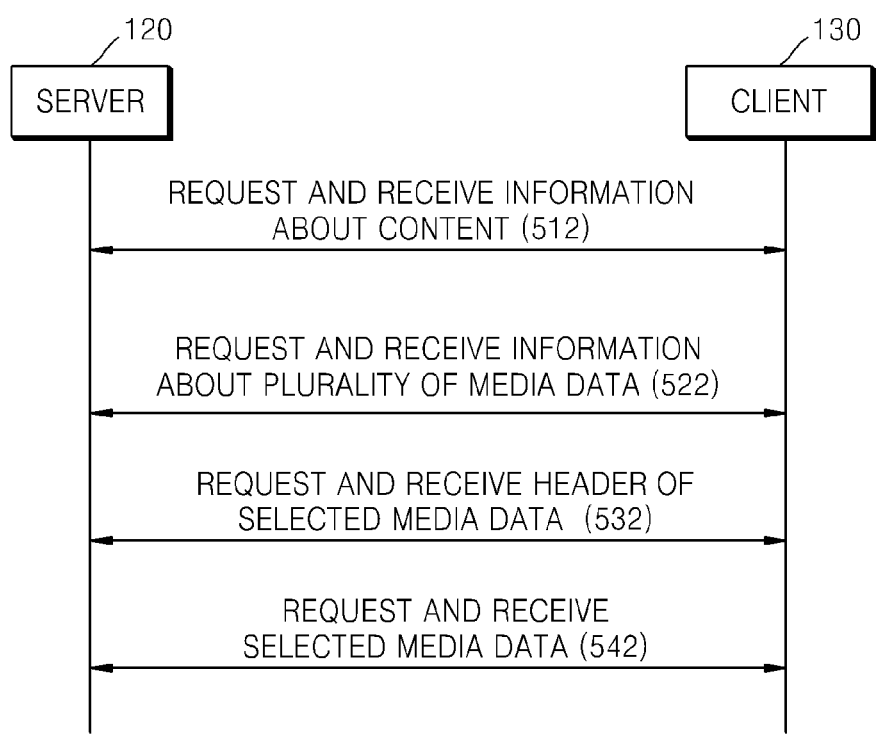

FIG. 5B is a flowchart for describing a streaming method according to another exemplary embodiment. Referring to FIG. 5B, the client 130 requests the server 120 to transmit information about predetermined content, in operation 512, and receives the information about predetermined content from the server 120. The client 130 may transmit an HTTP request for requesting the server 120 to transmit the information about predetermined content, and receive the information about predetermined content as an HTTP response to the HTTP request. The information about predetermined content may be included in an XML file.

In operation 522, the client 130 requests the server 120 to transmit information about a plurality of media data based on the information about predetermined content received in operation 512. The client 130 may request the server 120 for a media presentation description through the HTTP request, and receive the media presentation description as the HTTP response.

In operation 532, the client 130 requests a header of media data selected based on the information about the plurality of media data received in operation 522. At least one media data that is suitable to a streaming environment is selected from among the plurality of media data based on the information about the plurality of media data received in operation 522, and a header of the selected at least one media data is requested. The header of the selected at least one media data is requested by referring to the information about the plurality of media data received in operation 522. The server 120 transmits a file of the header of the selected at least one media data to the client 130 in response to the request of the client 130. The header may be a header of all a plurality of media data, e.g., the "Reference Data" illustrated in FIG. 15B, 18B, or 18C.

In operation 542, the client 130 requests the server 120 to transmit selected media data based on the information about the plurality of media data received in operation 522, and the header received in operation 532. The client 130 requests the server 120 to transmit at least one segment generated by encoding content to have a predetermined quality and dividing the encoded content based on time, and the server 120 transmits the requested at least one segment to the client 130. The transmitted media data may be media data that is segmented into at least one segment as illustrated in one of FIGS. 15A, 15B, and 18A, 18B and 18C.

Figure 10A:
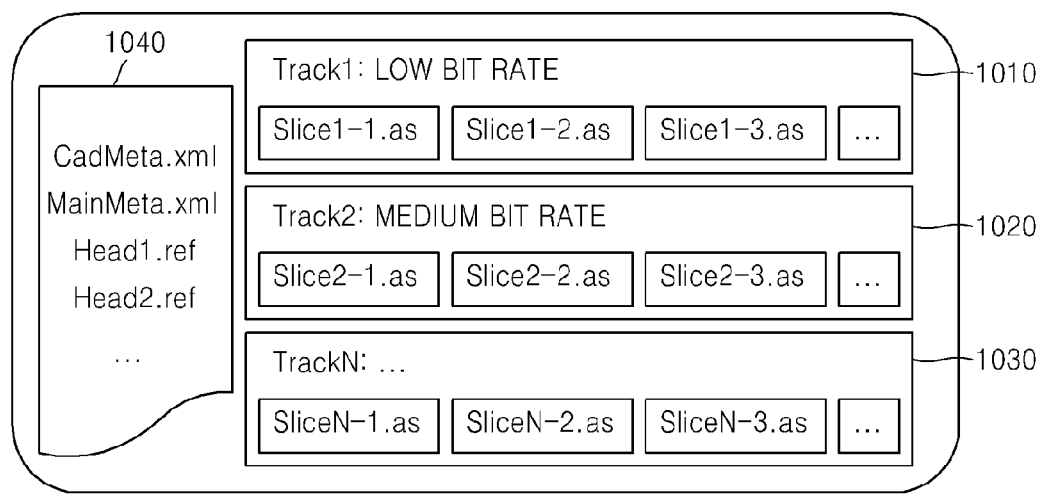
FIGS. 10A, 10B and 10C each illustrate a plurality of media data according to exemplary embodiments.
Figure 10B:
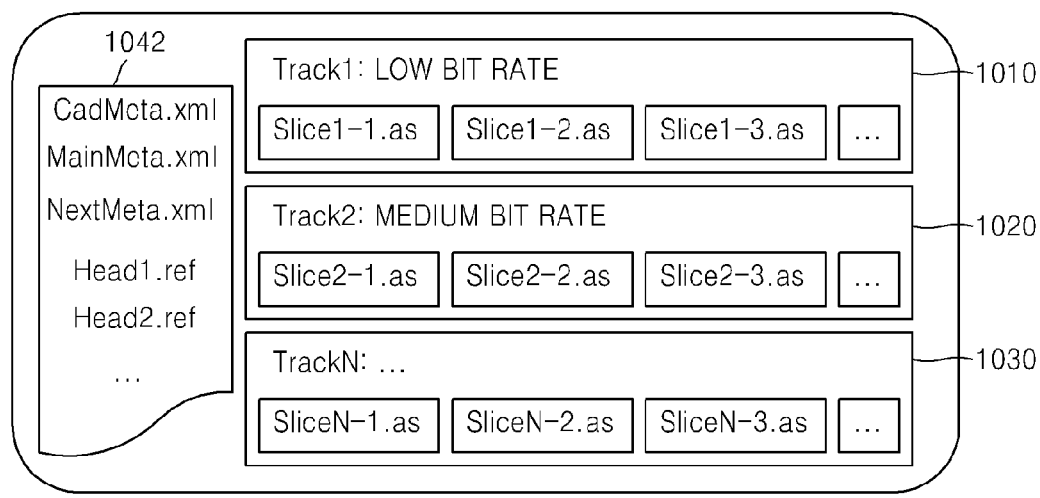
Figure 10C:
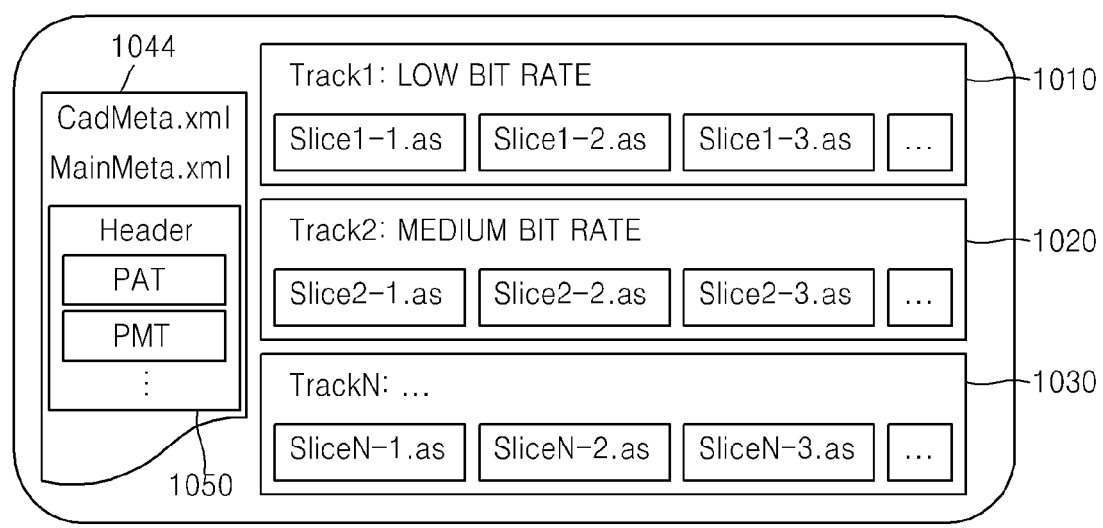

FIGS. 10A, 10B and 10C each illustrate a plurality of media data according to exemplary embodiments. FIGS. 10A, 10B and 10C each illustrate the plurality of media data included in the server 120 to perform the streaming methods according to FIGS. 5A and 5B.

Referring to FIG. 10A, the server 120 may include a plurality of media data 1010 through 1030 generated by encoding one content to have a plurality of different qualities, for streaming that is adaptive to a streaming environment. "Track1" through "TrackN" denote the plurality of media data 1010 through 1030. Also, each of the plurality of media data 1010 through 1030 may include at least one segment generated by dividing each of the plurality of media data 1010 through 1030 based on time. "Slice1-1.as", "Slice1-2.as", "Slice1-3.as", "Slice2-1.as", "Slice2-2.as", "Slice2-3.as", "SliceN-1.as", "SliceN-2.as", and "SliceN-3.as" denote at least one segment.

The server 120 may include information 1040 required for the client 130 to access the plurality of media data 1010 through 1030. The server 120 may include a "CadMeta.xml" file as information about content, a "MainMeta.xml" file as information about the plurality of media data 1010 through 1030, and a "Head1.ref" file, a "Head2.ref" file, etc. as header files of the plurality of media data 1010 through 1030. Here, the "Head1.ref" file may be a header file of the "Track1", and the "Head2.ref" file may be a header file of the "Track2".

The "CadMeta.xml" file may be a CAD file according to the OIPF standard, and the "MainMeta.xml" file may be the media presentation description described above. Also, the "Head1.ref" and "Head2.ref" files are selective elements, and may not exist when headers are included in the plurality of media data 1010 through 1030.

Referring to FIG. 10B, information 1042 required for the client 130 to access the plurality of media data 1010 through 1030 may further include a "NextMeta.xml" file. As described above, the "NextMeta.xml" file may be a media presentation description of a following content to be reproduced after current content. As described above, the media presentation description of the current content, i.e., the "MainMeta.xml" file, includes the URL of the media presentation description of the following content, and thus the client 130 may access the "NextMeta.xml" file based on the "MainMeta.xml" file.

Referring to FIG. 10C, headers of the plurality of media data 1010 through 1030 may exist in one header file 1050. In other words, a plurality of header files may not be present for the plurality of media data 1010 through 1030, respectively, but one header file 1050 may be present for all the plurality of media data 1010 through 1030 and may be included in information 1044 required to access the plurality of media data 1010 through 1030.

For example, when the plurality of media data 1010 through 1030 corresponds to elementary streams, e.g., an elementary stream according to the MPEG-2 standard, each of the header files of the plurality of media data 1010 through 1030 may include at least one of a PAT and a PMT. At least one of the PAT and the PMT may be separated from the plurality of media data 1010 through 1030 to prepare the header file 1050, and the media presentation description may include information pointing to the header file 1050. The information pointing to the header file 1050 may be URL information of the header file 1050 or information for specifying a transport stream packet including the header file 1050 in a MPEG-2 elementary stream. The header file 1050 may be a header of all the plurality of media data 1010 through 1030, e.g., the "Reference Data" illustrated in FIG. 15B, 18B, or 18C.

The PAT and the PMT may be separated as the header file 1050 or may be included in the plurality of media data 1010 through 1030, but may include an entire list of elementary streams included in the plurality of media data 1010 through 1030 regardless of the locations of the PAT and the PMT.

A case where PSI, e.g., the PAT and the PMT, is separated as an additional header from additional payload data, has been described above with reference to FIG. 15B. However, when the PSI is included in the plurality of media data 1010 to 1030, the PSI may be included in each segment of each of the plurality of media data 1010 to 1030, so that each segment may be reproduced separately based on the PSI.

Referring back to FIG. 5B, in operation 532, the client 130 may obtain the information pointing to the header file 1050 based on the media presentation description, and may request the header file 1050 based on this information. After the client 130 requests and receives the header file 1050 based on this information, the client 130 selects at least one from among the plurality of media data 1010 to 1030 based on at least one of the PAT and the PMT included in the header file 1050, and requests the server 120 to transmit the selected media data. The PAT and the PMT may include the entire list of the plurality of media data 1010 to 1030.

Figure 11A:
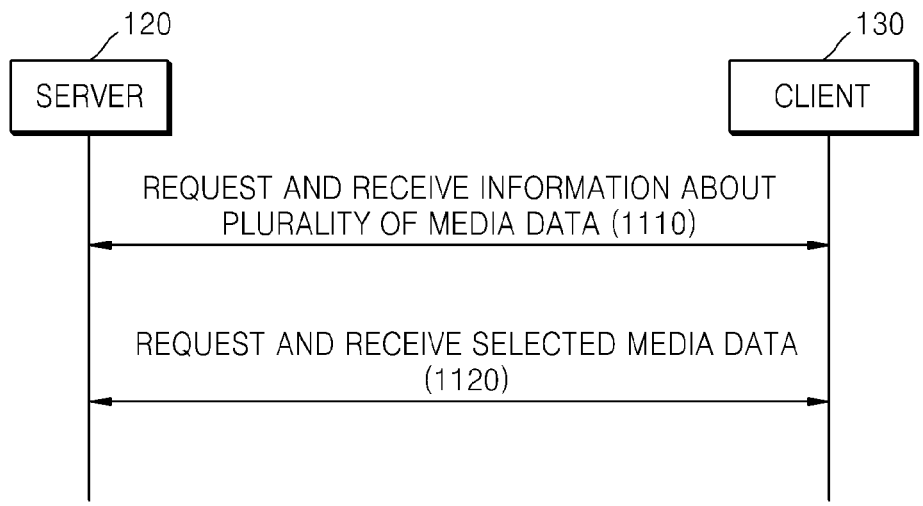
FIGS. 11A and 11B are flowcharts for describing streaming methods according to other exemplary embodiments.

FIG. 11A is a flowchart for describing a streaming method according to another exemplary embodiment. Referring to FIG. 11A, the client 130 requests information about a plurality of media data to the server 120, in operation 1110. The client 130 may request a media presentation description from the server 120 via an HTTP request, and may receive the media presentation description as an HTTP response. The client 130 requests the server 120 for and receives the information about the plurality of media data generated by encoding one content to have a plurality of different qualities, so as to perform streaming that is adaptive to a streaming environment. The streaming method of FIG. 11A is different from the streaming method of FIG. 5A as the information about the plurality of media data is requested and received without requesting and receiving information about content.

In operation 1120, the client 130 requests the server 120 to transmit at least one of the plurality of media data. The client 130 selects at least one media data encoded to have a quality suitable for the streaming environment by referring to the information about the plurality of media data, requests the server 120 to transmit the selected media data, and then receives the requested media data from the server 120. The transmitted media data may be media data that is segmented into at least one segment as illustrated in one of FIGS. 15A, 15B, and 18A, 18B and 18C.

Figure 11B:
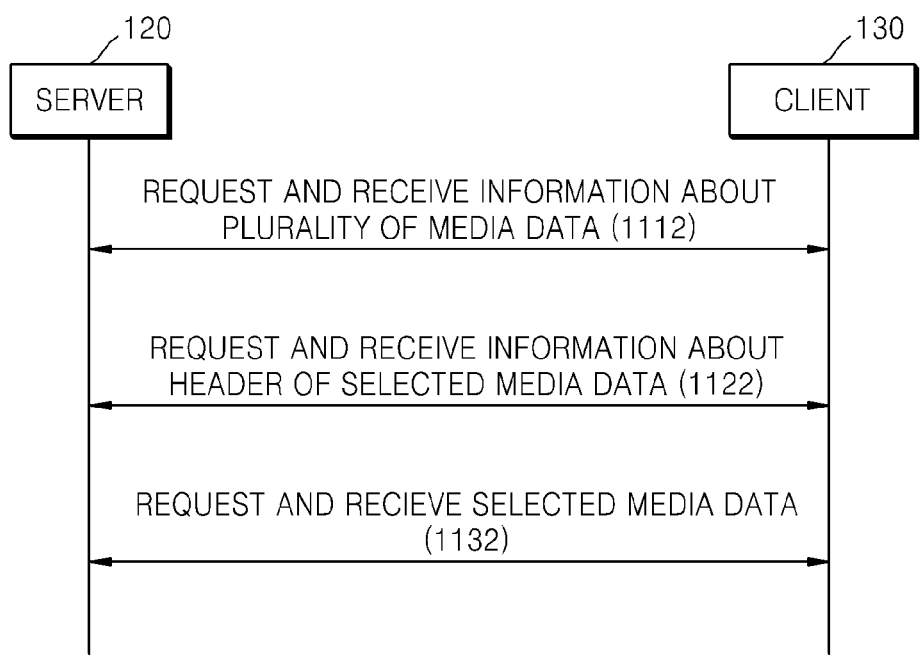

FIG. 11B is a flowchart for describing a streaming method according to another exemplary embodiment. Referring to FIG. 11B, the client 130 requests the server 120 to transmit information about a plurality of media data and receives the information about the plurality of media data from the server 120 in response to the request, in operation 1112. The client 130 may request the server 120 for a media presentation description through an HTTP request, and receive the media presentation description as an HTTP response.

In operation 1122, the client 130 requests a header of media data selected based on the information about the plurality of media data received in operation 1112. The client 130 requests the header of media data selected according to a streaming environment by referring to the information about the plurality of media data received in operation 1112. In response to the request, the server 120 transmits a file including the header of the selected media data to the client 130. The header may be a header of all the plurality of media data, i.e., the "Reference Data" illustrated in FIG. 15B, 18B, or 18C.

In operation 1132, the client 130 requests the server 120 to transmit the selected media data based on the information about the plurality of media data received in operation 1112, and the header received in operation 1122. The client 130 requests the server 120 to transmit at least one segment generated by encoding content in a predetermined quality and dividing the encoded content based on time, and the server 120 transmits the requested at least one segment to the client 130. The transmitted media data may be media data that is segmented into at least one segment as illustrated in one of FIGS. 15A, 15B, and 18A, 18B and 18C.

Figure 12A:
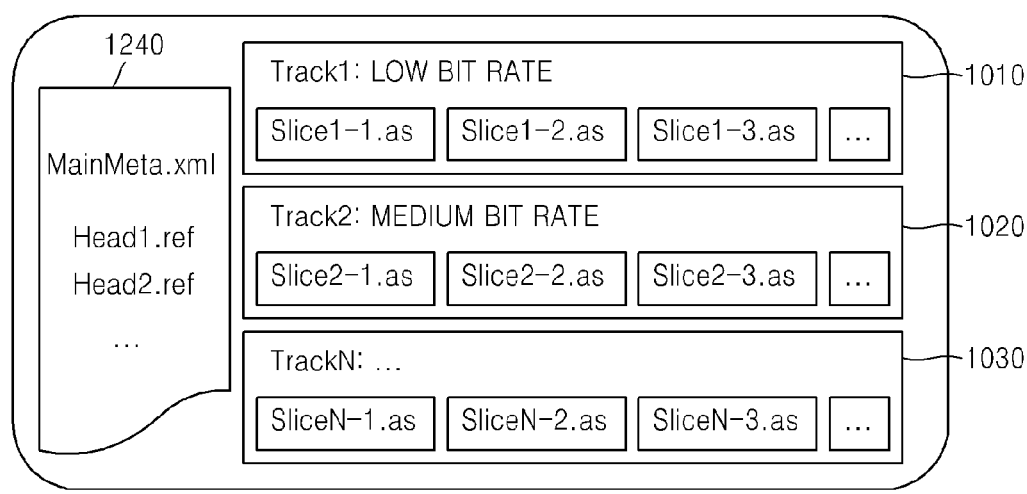
FIGS. 12A, 12 B and 12C each illustrate a plurality of media data according to other exemplary embodiments.
Figure 12B:
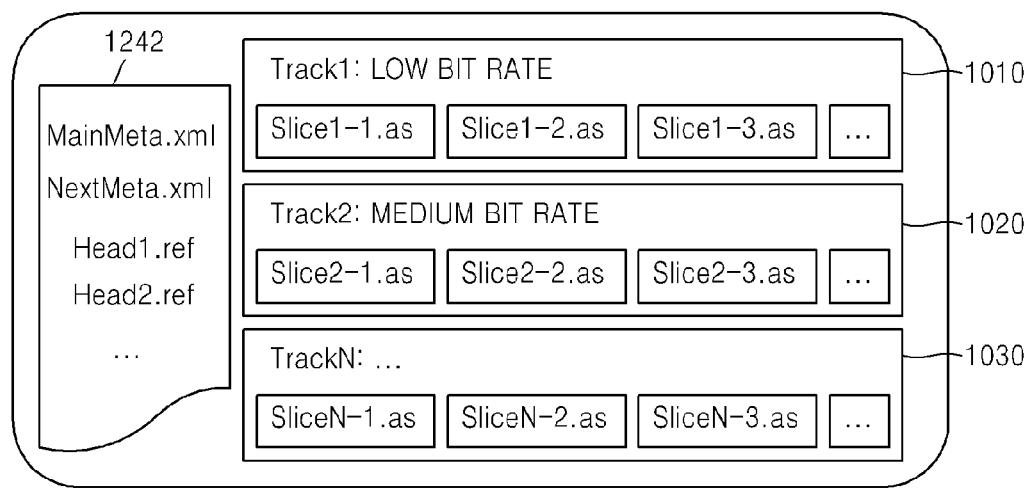
Figure 12C:
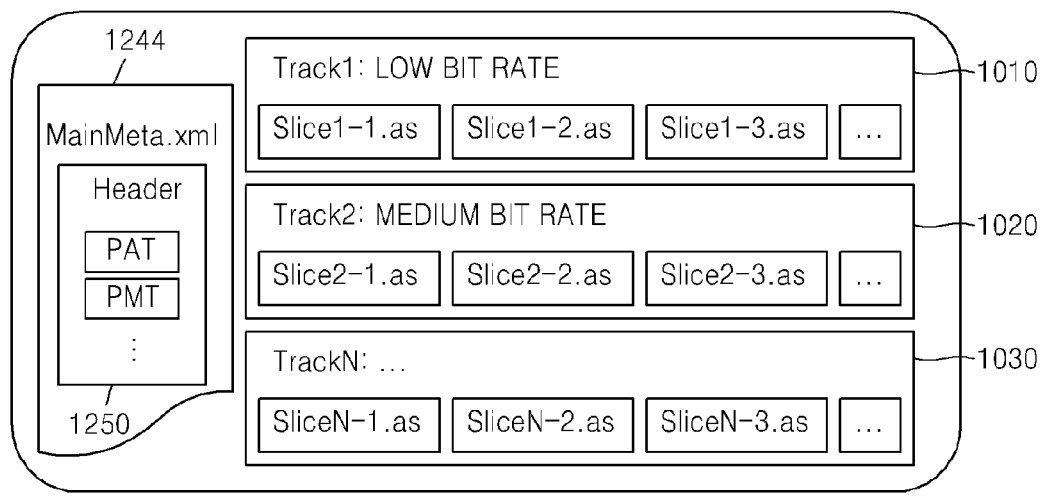

FIGS. 12A, 12B and 12C each illustrate a plurality of media data according to other exemplary embodiments. FIGS. 12A and 12B each illustrate the plurality of media data included in the server 120, which are used to perform the streaming methods of FIGS. 11A and 11B.

Referring to FIG. 12A, the server 120 may include the plurality of media data 1010 through 1030 generated by encoding one content to have the plurality of different qualities for streaming that is adaptive to a streaming environment, as shown in FIG. 10A.

Here, the plurality of media data 1010 through 1030 of FIG. 12A is different from the plurality of media data 1010 through 1030 of FIG. 10A in information 1240 required for the client 130 to access the plurality of media data 1010 through 1030, wherein the server 120 only includes information about the plurality of media data 1010 through 1030 and not information about content, unlike the exemplary embodiment of FIG. 10A. Here, the client 130 may receive the information about content from another entity instead of the server 120, and access the plurality of media data 1010 through 1030 included in the server 120 based on the received information about content.

Referring to FIG. 12B, information 1242 required for the client 130 to access the plurality of media data 1010 through 1030 may be prepared by further including a "Next-Meta.xml" file to the information 1240 of FIG. 12A.

Referring to FIG. 12C, the header files of the plurality of media data 1010 through 1030 may exist in one header file 1250. The header files do not exist for each of the plurality of media data 1010 through 1030, but may be included in information 1244 required to access the plurality of media data 1010 through 1030, as one header file 1250. The header file 1250 corresponds to the header file 1050 of FIG. 10C, and the header file 1050 may correspond to the "Reference Data" described with reference to FIGS. 15B, 17B, and 17C, as described above with reference to FIG. 10C.

Figure 13:
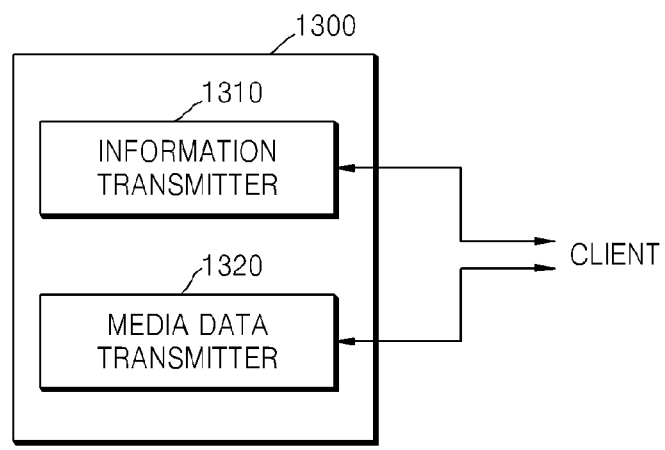
FIG. 13 is a block diagram of an apparatus for transmitting media data, included in a server, according to an exemplary embodiment.

FIG. 13 is a block diagram of an apparatus 1300 for transmitting media data, included in the server 120, according to an exemplary embodiment. Referring to FIG. 13, the apparatus 1300 of the server 120 includes an information transmitter 1310 and a media data transmitter 1320.

The information transmitter 1310 receives a request to transmit predetermined information from the client 130, and transmits the predetermined information to the client 130 in response to the request. The information transmitter 1310 receives a request to transmit at least one of information about content and information about a plurality of media data from the client 130, and transmits requested information to the client 130. The information transmitter 1310 receives an HTTP request for requesting at least one of the information about content and the information about the plurality of media data from the client 130, and transmits requested information as an HTTP response.

The media data transmitter 1320 receives a request to transmit at least one media data selected from the plurality of media data according to a streaming environment from the client 130, and transmits requested media data to the client 130. The information transmitter 1310 receives a request to transmit media data selected based on the information about the plurality of media data transmitted to the client 130. The server 120 may transmit the requested media data to the client 130 by receiving and storing the plurality of media data encoded to have different qualities by the encoding device 110. Also, the server 120 may receive the requested media data from the encoding device 110 and transmit the requested media data to the client 130 in real-time according to the request of the client 130.

Figure 14:
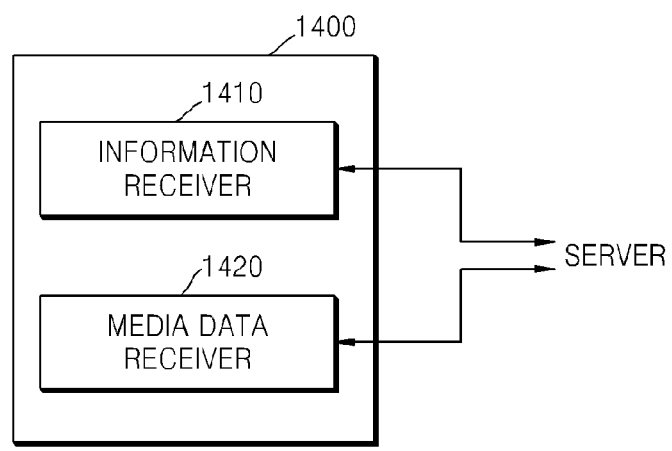
FIG. 14 is a block diagram of an apparatus for receiving media data, included in a client, according to an exemplary embodiment.

FIG. 14 is a block diagram of an apparatus 1400 for receiving media data, included in the client 130, according to an exemplary embodiment. Referring to FIG. 14, the apparatus 1400 of the client 130 includes an information receiver 1410 and a media data receiver 1420.

The information receiver 1410 transmits a request to transmit predetermined information to the server 120, and receives the predetermined information from the server 120 in response to the request. The information receiver 1410 transmits a request to transmit at least one of information about content and information about a plurality of media data to the server 120, and receives requested information from the server 120. According to the exemplary embodiments of FIGS. 2A, 2B, 5A, 5B, 11A, and 11B, the information receiver 1410 transmits an HTTP request requesting the server 120 to transmit at least one of the information about content and the information about the plurality of media data, and receives requested information as an HTTP response from the server 120.

The media data receiver 1420 transmits a request to transmit at least one media data selected from among the plurality of media data according to a streaming environment to the server 120, and receives requested media data from the server 120. The information receiver 1410 transmits a request to transmit media data selected according to the streaming environment based on the information about the plurality of media data received from the server 120.

According to an exemplary embodiment, streaming that is adaptive to a streaming environment can be performed by using a conventional protocol without having to change a structure of a server and/or a client, and thus an adaptive streaming system that is compatible with various media data formats can be manufactured at low cost.

An exemplary embodiment can also be embodied as computer readable codes on a computer readable recording medium.

For example, a streaming apparatus of a server and a streaming apparatus of a client according to exemplary embodiments may include a bus coupled to each unit of the apparatus 1300 of FIG. 13 and the apparatus of FIG. 14, and at least one processor connected to the bus. Also, the streaming apparatuses may further include a memory coupled to the at least one processor, so as to store a command, a received message, or a generated message, wherein the at least one processor is combined to the bus to perform the command.

The computer readable recording medium is any data storage device that can store data which can be thereafter read by a computer system. Examples of the computer readable recording medium include, but are not limited to, read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of receiving content, the method comprising:
receiving, at a client processor from a server processor, a file regarding a plurality of media data generated by encoding a content component to have a different property, wherein the content includes at least one of content component including at least one of audio, video and text;
receiving, at the client processor from the server processor, a first segment, included in a first media data of the plurality of media data by requesting the first segment based on the file;
receiving, at the client processor from the server processor, a second segment, included in a second media data of the plurality of media data, by requesting the second segment based on the file, wherein the second segment corresponds to a next segment, following the first segment included in the first media data,
wherein the file comprises a period tag comprising a location element of an external file including attribute information of external media data,
wherein the file further comprises a media data tag comprising an identifier element and a quality element of each of the plurality of media data,
wherein the file further comprises a segment tag comprising an identifier element of each of a plurality of segments,
wherein a level of the period tag is hierarchically higher than a level of the media data tag,
wherein the level of the media data tag is hierarchically higher than a level of the segment tag,
wherein the identifier element of the each of the plurality of the segments includes a time identifier of the each of the plurality of segments and the time identifier is substituted for assigning one of the plurality of segments,
wherein the file further comprises a start adjustment element for compensating a presentation time of the plurality of the segments to ensure alignment of the plurality of the media data which have the different property, and
wherein the file further comprises at least one URL tag that varies in accordance with a rating, for restricting a presentation of the plurality of media data to the client.

2. The method of claim 1, wherein a transport stream of a random access point comprises information indicating that the transport stream is related to the random access point, and wherein at least one data segment starts with the random access point.

3. The method of claim 1, wherein the file further comprises information referencing at least one of a program association table (PAT) and a program map table (PMT) relating to the plurality of media data.

4. The method of claim 3, wherein the PAT and the PMT are initialization segments and are separated from the plurality of media data.

5. The method of claim 3, wherein at least one of the PAT and the PMT comprises a list of all of the plurality of media data.

6. The method of claim 3, wherein each one of the plurality of media data is assigned a different respective one of a plurality of packet identifiers (PIDs).

7. The method of claim 3, wherein each one of the plurality of media data comprises a respective packetized elementary stream (PES) including a respective presentation time stamp (PTS) and a respective decoding time stamp (DTS),
wherein the method further comprises aligning the respective presentation time stamps and the respective decoding time stamps according to reproduction time.

8. The method of claim 1, wherein each of the plurality of segments comprises at least one transport stream of at least one group of pictures (GOP).

9. The method of claim 1, wherein the plurality of media data are media data in an MP4 format, and
wherein the plurality of media data correspond to "trak" boxes in the MP4 format.

10. The method of claim 1, wherein the plurality of media data are media data in an MPEG-2 TS (MPEG-2 transport stream) format, and wherein the plurality of media data correspond to elementary streams in the MPEG-2 TS format.

11. The method of claim 1, wherein each of the plurality of segments comprises at least one packetized elementary stream (PES).

12. The method of claim 11, wherein the at least one PES comprises data about at least one of a video frame or an audio frame.

* * * * *